US012220831B2

(12) United States Patent
Gereg et al.

(10) Patent No.: US 12,220,831 B2
(45) Date of Patent: Feb. 11, 2025

(54) KNIFE ASSEMBLIES OF SLICING MACHINES, METHODS OF CLAMPING AND RELEASING KNIVES THEREFROM, AND SLICING MACHINES EQUIPPED THEREWITH

(71) Applicant: Urschel Laboratories, Inc., Chesterton, IN (US)

(72) Inventors: Dustin J. Gereg, Valparaiso, IN (US); Scott Alan Klockow, Kouts, IN (US); Corey Everette Baxter, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 0 days.

(21) Appl. No.: 17/705,497

(22) Filed: Mar. 28, 2022

(65) Prior Publication Data
US 2022/0332004 A1   Oct. 20, 2022

Related U.S. Application Data

(60) Provisional application No. 63/176,977, filed on Apr. 20, 2021.

(51) Int. Cl.
*B26D 7/26*  (2006.01)
*A47J 43/07*  (2006.01)
(Continued)

(52) U.S. Cl.
CPC ............ *B26D 7/2614* (2013.01); *A47J 43/07* (2013.01); *B26D 1/0006* (2013.01);
(Continued)

(58) Field of Classification Search
CPC ............ B26D 7/2614; B26D 2001/006; B26D 1/0006; B26D 7/0691; B26D 2210/02; B26D 7/26; A47J 43/07
See application file for complete search history.

(56) References Cited

U.S. PATENT DOCUMENTS 2,769,650 A * 11/1956 Larson ................. A47B 3/0818
                                                        248/188
3,680,448 A *  8/1972 Ballingall ............... E01F 9/646
                                                        404/9
(Continued)

FOREIGN PATENT DOCUMENTS

WO        2005069920        8/2005

OTHER PUBLICATIONS

International Search Report and Written Opinion for International Application No. PCT/US2022/025551, dated Jul. 29, 2022, (10 pages).

(Continued)

*Primary Examiner* — Jonathan G Riley
(74) *Attorney, Agent, or Firm* — Hartman Global IP Law; Gary M. Hartman; Domenica N. S. Hartman

(57) ABSTRACT

Knife assemblies for securing knives to slicing machines, slicing machines equipped therewith, and methods of operating knife assemblies for securing knives to and releasing knives from slicing machines. Such a knife assembly includes a knife holder having a knife support surface, a knife supported on the knife support surface, and a clamp having a base portion adjacent a trailing edge of the clamp and a knife-engaging portion adjacent a leading edge of the clamp. The knife assembly applies a clamping load to the clamp to secure the knife to the knife holder. The clamp is prevented from translating relative to the shaped knife in a leading direction of the knife assembly as the clamping load is applied and/or permits removal of the clamp by being translated in the leading direction.

16 Claims, 21 Drawing Sheets

(51) Int. Cl.
*B26D 1/00* (2006.01)
*B26D 7/06* (2006.01)

(52) U.S. Cl.
CPC ...... *B26D 2001/006* (2013.01); *B26D 7/0691* (2013.01); *B26D 2210/02* (2013.01)

(56) References Cited

U.S. PATENT DOCUMENTS

| | | | |
|---|---|---|---|
| 4,523,503 A * | 6/1985 | Julian | B26D 1/36 83/404.3 |
| 6,968,765 B2 | 11/2005 | King | |
| 8,161,856 B2 * | 4/2012 | Jacko | B26D 7/0691 83/403 |
| 8,714,068 B2 | 5/2014 | Ornelaz, Jr. | |
| 9,517,572 B2 * | 12/2016 | Michel | B26D 7/2628 |
| 2005/0000344 A1 | 1/2005 | Bucks | |
| 2014/0090536 A1 | 4/2014 | Ornelaz, Jr. | |
| 2015/0174777 A1 | 6/2015 | Jacko et al. | |
| 2016/0288356 A1 | 10/2016 | Bucks | |
| 2016/0288358 A1 | 10/2016 | Bucks | |
| 2017/0211743 A1 * | 7/2017 | Yanyk | H05K 5/0017 |
| 2018/0333886 A1 * | 11/2018 | Gereg | B26D 1/03 |
| 2019/0210239 A1 | 7/2019 | Baxter et al. | |
| 2019/0329437 A1 * | 10/2019 | Gereg | B26D 7/2614 |
| 2020/0262096 A1 | 8/2020 | Bucks | |

OTHER PUBLICATIONS

International Preliminary Report on Patentability, for International Application No. PCT/US2022/025551, filed Jul. 29, 2022, dated Nov. 2, 2023, 6 pages.

* cited by examiner

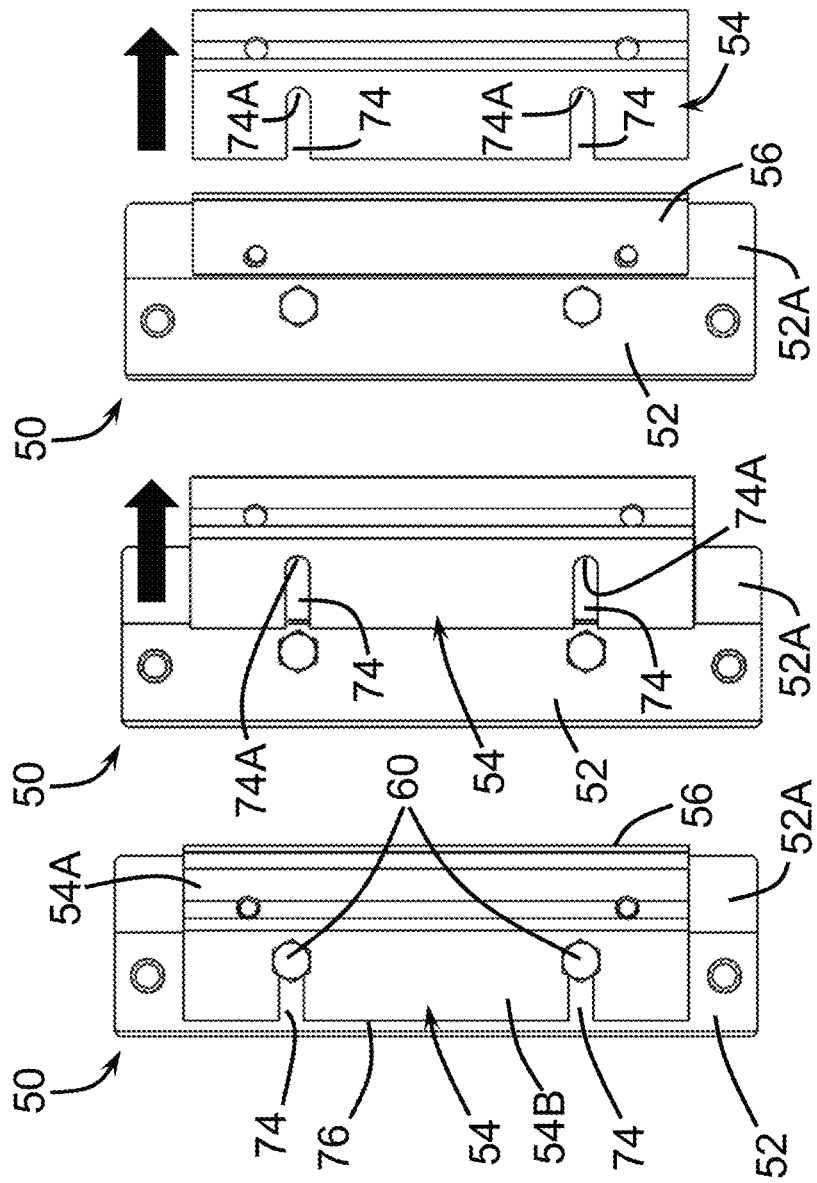

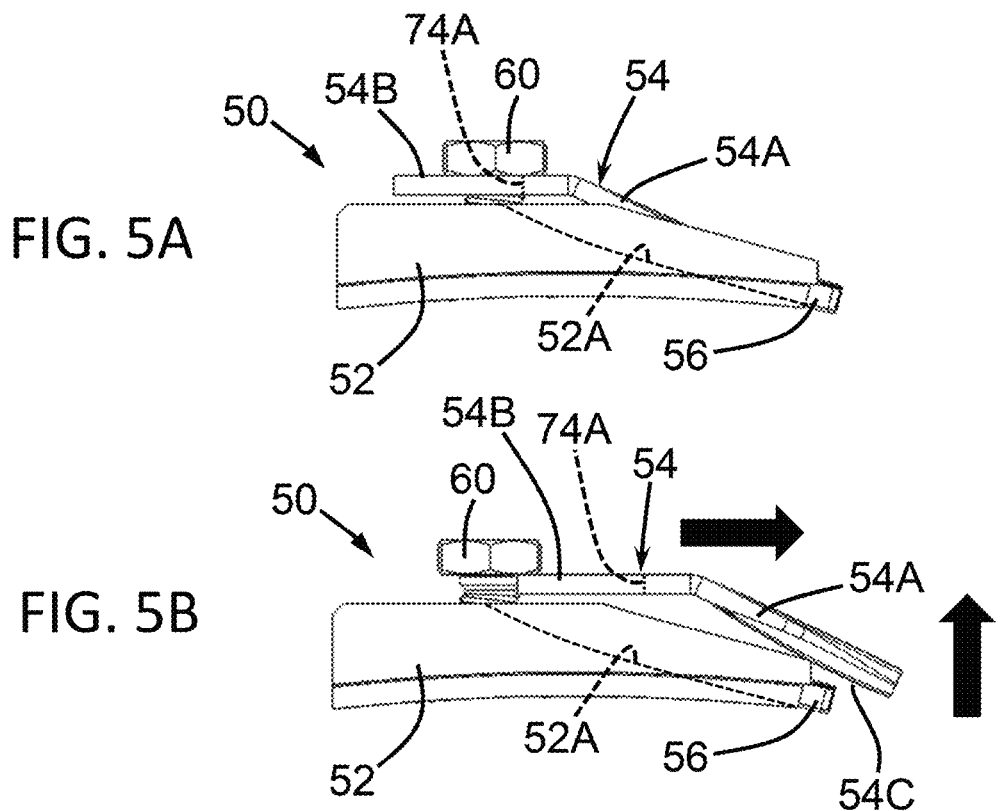
FIG. 5A
FIG. 5B
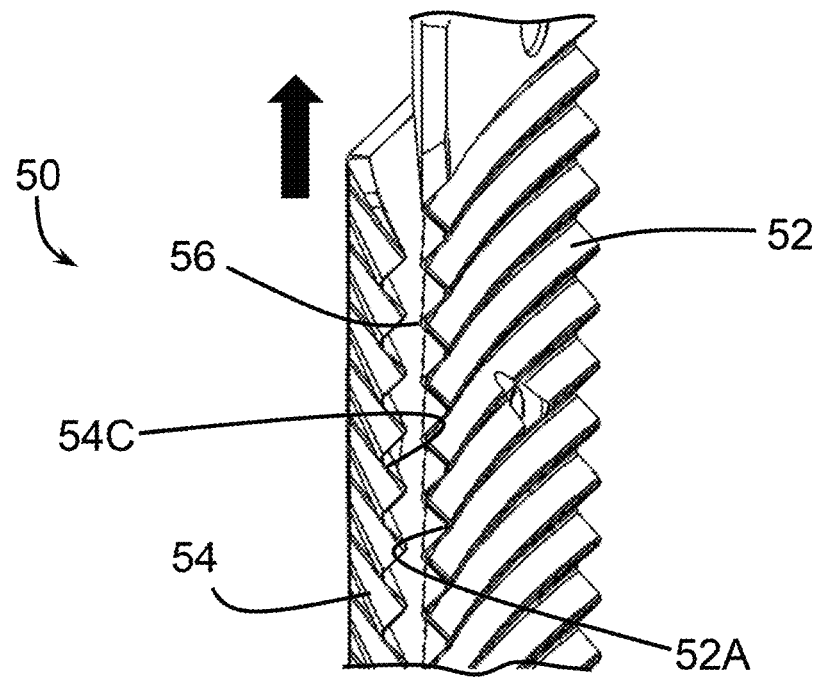
FIG. 6

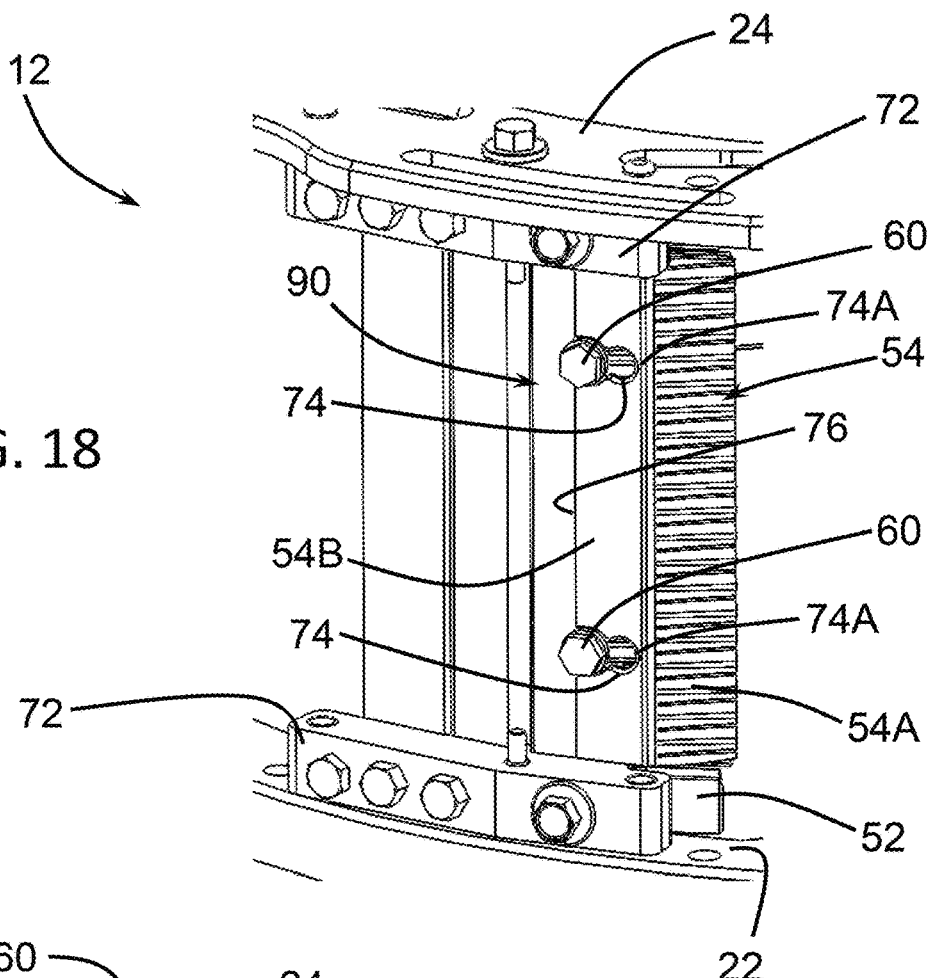
FIG. 18
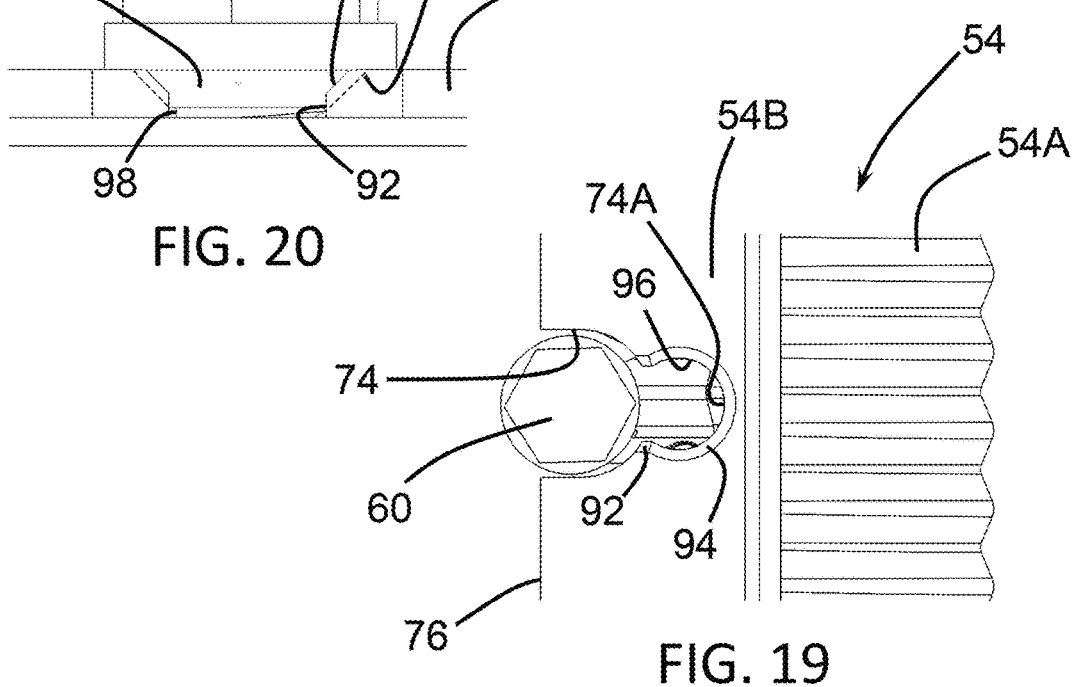
FIG. 20
FIG. 19

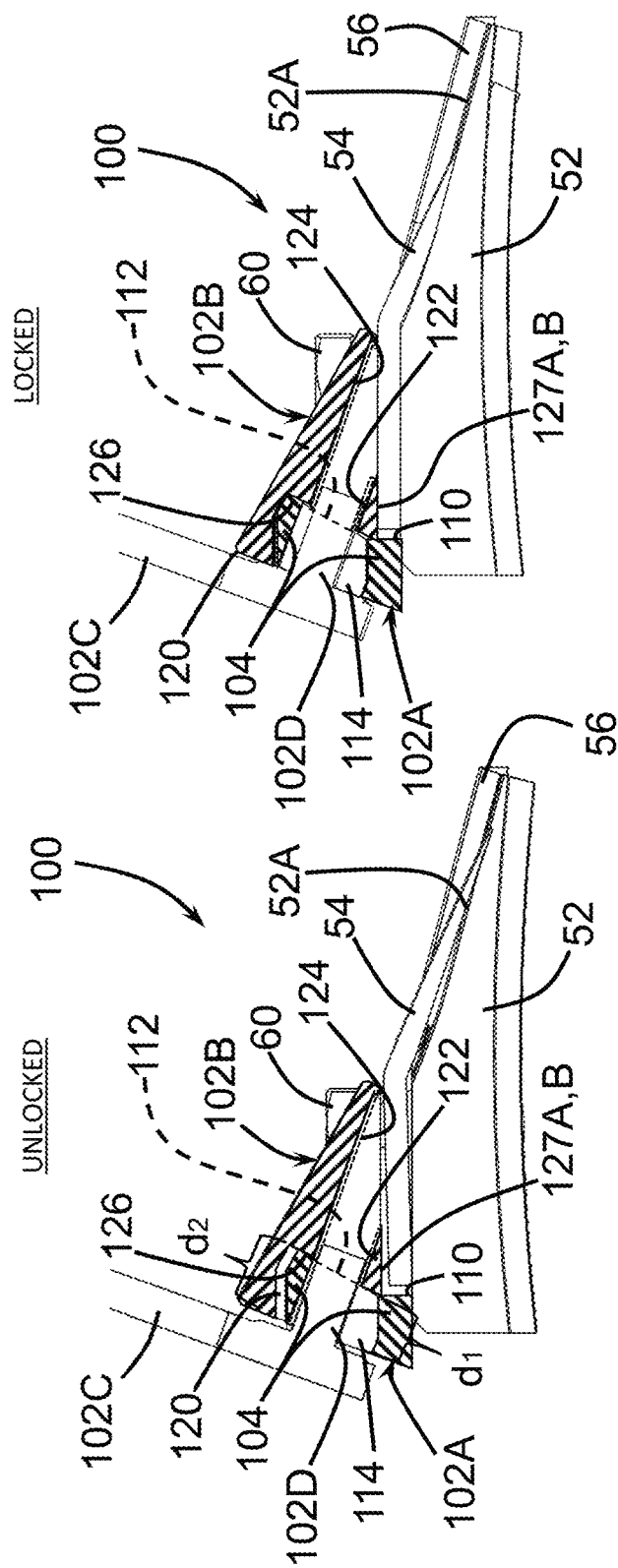

KNIFE ASSEMBLIES OF SLICING MACHINES, METHODS OF CLAMPING AND RELEASING KNIVES THEREFROM, AND SLICING MACHINES EQUIPPED THEREWITH

CROSS REFERENCE TO RELATED APPLICATIONS

This application claims the benefit of U.S. Provisional Application No. 63/176,977 filed Apr. 20, 2021, the contents of which are incorporated herein by reference.

BACKGROUND OF THE INVENTION

The present invention generally relates to methods and machines for cutting products, including but not limited to slicing food products. The invention particularly relates to knife assemblies for securing knives to slicing machines, slicing machines equipped therewith, and methods of operating knife assemblies for securing knives to and releasing knives from slicing machines.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the name Model CC®. The Model CC® machines are centrifugal-type slicers capable of slicing a wide variety of products at high production capacities. The Model CC® line of machines is particularly adapted to produce uniform slices, strip cuts, shreds, and granulations. Certain configurations and aspects of Model CC® machines are represented in U.S. Pat. Nos. 3,139,128, 3,139,129, 5,694,824, 6,968,765, 7,658,133, 8,161,856, 9,193,086, 10,456,943, and 10,632,639, the entire contents of which are incorporated herein by reference.

FIG. 1 schematically represents a cross-sectional view of a machine 10 that is representative of a Model CC® machine. The machine 10 includes a generally annular-shaped cutting head 12 and an impeller 14 coaxially mounted within the cutting head 12. The impeller 14 has an axis 17 of rotation that coincides with the center axis of the cutting head 12, and is rotationally driven about its axis 17 through a shaft (not shown) that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with cutting knives (not shown) that are mounted along the circumference of the cutting head 12. The impeller 14 comprises generally radially oriented paddles 13, each having a face that engages and directs the products radially outward toward and against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

FIGS. 2A and 2B are, respectively, isolated and fragmentary bottom views of a particular but nonlimiting example of a cutting head 12 that has been used with Model CC® slicing machines, including the machine 10 schematically represented in FIG. 1. The cutting head 12 represented in FIGS. 2A and 2B will be described hereinafter in reference to the machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIGS. 2A and 2B as well as other representations of cutting heads herein. Furthermore, as used herein, "leading" (and related forms thereof) refers to a position on a cutting head (or a component thereof) that is ahead of or precedes another in the direction of rotation of an impeller assembled with and rotating within the cutting head, whereas "trailing" (and related forms thereof) refers to a position on the cutting head (or a component thereof) that follows or succeeds another relative to the direction of the impeller's rotation.

In FIG. 2A, the cutting head 12 can be seen as generally annular-shaped with cutting knives 20 mounted and circumferentially spaced apart along its perimeter. FIGS. 2A and 2B represent the knives 20 as each having a straight cutting edge and being substantially flat between its oppositely-disposed cutting and trailing edges, and as such are referred to herein as "flat" knives that are commonly used to produce flat slices, though the cutting head 12 can use knives of other shapes. As an example, a "shaped" knife is referred to herein as a knife that does not have a straight cutting edge and is not substantially flat between its cutting and trailing edges. Shaped knives include but are not limited to what may be referred to herein as "corrugated" knives characterized by a periodic pattern of alternating peaks and valleys when viewed edgewise and commonly used to produce corrugated, strip-cut, shredded, or granulated products. Each knife 20 projects radially inward in a direction generally opposite the direction of rotation of the impeller 14 within the cutting head 12, and defines a cutting edge at its innermost radial extremity. The cutting head 12 further comprises lower and upper support members, represented in FIG. 2A as rings 22 and ring 24, to and between which circumferentially-spaced support segments, referred to herein as shoes 26, are secured with fasteners 34.

A knife 20 can be associated with each shoe 26, in which case the shoes 26 may be referred to as cutting stations of the cutting head 12. The knives 20 of the cutting head 12 are represented in FIGS. 2A and 2B as individually secured with knife assemblies 28 to their respective shoes 26. Each knife assembly 28 is represented as including a knife holder 30 mounted to a shoe 26 and between the support rings 22 and 24, and a clamp 32 positioned on the radially outward-facing side of the holder 30 to secure a knife 20 thereto. Each knife 20 is supported by a radially outer surface of one of the knife holders 30 at a leading edge of the knife holder 30. The radially outer surfaces of the knife holders 30 that contact and support the knives 20 are referred to herein as knife support surfaces 30A, and each is represented as having a shape (e.g., flat or shaped) that is complementary to the shape (e.g., flat or shaped) of the knife 20 it supports. The corresponding clamp 32 overlies the holder 30 so that the knife 20 is between the knife support surface 30A of the holder 30 and a radially inner surface of the clamp 32 that faces the holder 30 and is located adjacent a leading edge of the clamp 32. The radially inner surfaces of the clamps 32 that contact and overlie the knives 20 are referred to herein as knife clamping surfaces 32A, and may have shapes (e.g., flat or shaped) that are complementary to the shapes (e.g., flat or shaped) of the knives 20 they contact. By forcing the clamp 32 toward the knife support surface 30A of the holder 30, for example, with bolts 36, the clamp 32 applies a clamping force to the knife 20 adjacent its cutting edge. FIGS. 2A and 2B further show a gate 38 secured to each shoe 26. A food product crosses the gate 38 prior to encountering the knife 20 mounted to the succeeding shoe 26, and together the cutting edge of a knife 20 and a trailing edge of the preceding gate 38 define a gate opening 40 (FIG. 2B) that determines the thickness of a slice produced by the knife 20.

FIG. 2B evidences that the bolts 36 advantageously prevent the clamp 32 from moving relative to the knife 20 and knife holder 30 in a leading direction of the cutting head 12 (indicated by the horizontal arrow in FIG. 2B) as and after the bolts 36 are tightened to secure the clamp 32 and knife 20 to the knife holder 30, which ensures that the leading edge of the clamp 32 is properly located in relation to the leading edge of the knife holder 30 to ensure a desirable clamping effect on the knife 20. Only after the bolts 36 are entirely removed are the clamp 32 and knife 20 able to be removed from the knife holder 30 by lifting them individually or together in the radial direction of the cutting head 12 (indicated by the vertical arrow in FIG. 2B). The knife 20 and clamp 32 are also able to freely translate individually or together in the leading direction of the cutting head 12 (indicated by the horizontal arrow in FIG. 2B) and the axial direction of the cutting head 12 (in a direction perpendicular to the vertical and horizontal arrows in FIG. 2B). These movements are possible even while the knife 20 and clamp 32 remain engaged with the knife holder 30.

FIG. 3 illustrates a knife assembly 28 that utilizes a corrugated knife 20 of a type capable of producing corrugated, strip-cut, shredded, or granulated products. FIG. 3 is a circumferential view of the knife assembly 28 in the trailing direction, such that the leading edges of the knife 20, knife holder 30, and clamp 32 are visible. As evident from FIG. 3, due to the complementary shapes of the knife 20, knife clamping surface 32A of the clamp 32, and knife support surface 30A of the holder 30, the knife 20 and clamp 32 are prevented from translating relative to each other and to the knife holder 30 in the axial direction (indicated by the vertical arrow in FIG. 3) of the cutting head 12 while the knife 20 and clamp 32 still engage the knife support surface 30A of the knife holder 30. As a result, to remove the clamp 32 and knife 20 from the knife holder 30, the knife 20 and clamp 32 must first be translated in the radial direction (indicated by the horizontal arrow in FIG. 3) or the leading direction of the cutting head 12 (in a direction perpendicular to the vertical and horizontal arrows in FIG. 3) to disengage the knife 20 and clamp 32 from the knife support surface 30A of the knife holder 30.

While the Model CC® has performed extremely well for its intended purpose, further improvements are continuously desired and sought for slicing machines of the type represented by the Model CC®. As an example, in some situations it may be desirable to enable a shaped knife (for example, the corrugated knife 20 of FIG. 3) to be secured with bolts 36 to prevent the clamp 32 from moving circumferentially relative to the knife 20 and knife holder 30 as and after the bolts 36 are tightened to ensure that the leading edge of the clamp 32 is properly located in relation to the leading edge of the knife holder 30, and yet not require complete removal of the bolts 36 to remove the clamp 32 and knife 20 from the cutting head 12.

BRIEF SUMMARY OF THE INVENTION

The present invention provides knife assemblies for securing knives to slicing machines, slicing machines equipped therewith, and methods of operating knife assemblies for securing knives to and releasing knives from slicing machines.

According to a nonlimiting aspect of the invention, a knife assembly includes a knife holder having a knife support surface, a knife supported on the knife support surface of the knife holder so as to protrude from a leading edge of the knife holder, and a clamp having a base portion adjacent a trailing edge of the clamp and a knife-engaging portion adjacent a leading edge of the clamp. The base portion has at least one slot formed therein and at least part of the knife-engaging portion has a shape complementary to the knife. The knife assembly further has means for applying a clamping load to the clamp to secure the knife to the knife holder, wherein the applying means comprises a fastener received in the slot in the base portion of the clamp. The knife assembly also has means for preventing the clamp from translating relative to the knife in a leading direction of the knife assembly as the clamping load is applied to the clamp by the applying means.

According to another nonlimiting aspect of the invention, a method is provided for removing a clamp of a knife assembly that secures a knife to a cutting head of a slicing machine. The cutting head has a leading direction, a trailing direction opposite the leading direction, an axial direction perpendicular to the leading and trailing directions, and a radial direction perpendicular to the leading, trailing, and radial directions. The clamp has a knife-engaging portion that forms a leading edge of the clamp, has a shape that is complementary to the knife, and physically contacts the knife when in a clamping position. The method includes removing a clamping load from the clamp that secures the clamp in the clamping position, translating the clamp in the leading direction of the cutting head so that the clamp arrives at a release position and the knife-engaging portion no longer contacts the knife in the release position, and then removing the clamp from the knife assembly.

According to other aspects of the invention, slicing machines are provided that are equipped with one or more knife assemblies having elements as described above.

Technical effects of the invention include the ability to enable a clamp to be removed from a knife assembly equipped with a knife by translating the clamp in the leading direction of the knife assembly, and in some cases prevent the clamp from translating relative to the knife, particularly in the leading direction of the knife assembly, as the clamping load is applied to the clamp.

Other aspects and advantages of this invention will be appreciated from the following detailed description.

BRIEF DESCRIPTION OF THE DRAWINGS

FIGS. 4A through 9D schematically represent knife assemblies adapted to mount to cutting heads of slicing machines, such as but not limited to the cutting head of FIG. 2A and the slicing machine of FIG. 1, and represent alternative methods of removing clamps from the knife assemblies.

FIG. 18 is a fragmentary side view of a knife assembly for a slicing machine, and represents the knife assembly as comprising a knife holder and a clamp retaining a shaped knife on the knife holder according to another nonlimiting embodiment of the present invention.

FIG. 19 is a detailed side view of the knife assembly of FIG. 18, and FIG. 20 is a fragmentary cross-sectional view of the knife assembly of FIG. 18.

FIGS. 26 and 27 are cross-sectional views of the knife assembly of FIGS. 21 and 22, representing the knife assembly in unlocked (FIG. 26) and locked (FIG. 27) configurations.

DETAILED DESCRIPTION OF THE INVENTION

Figure 1:
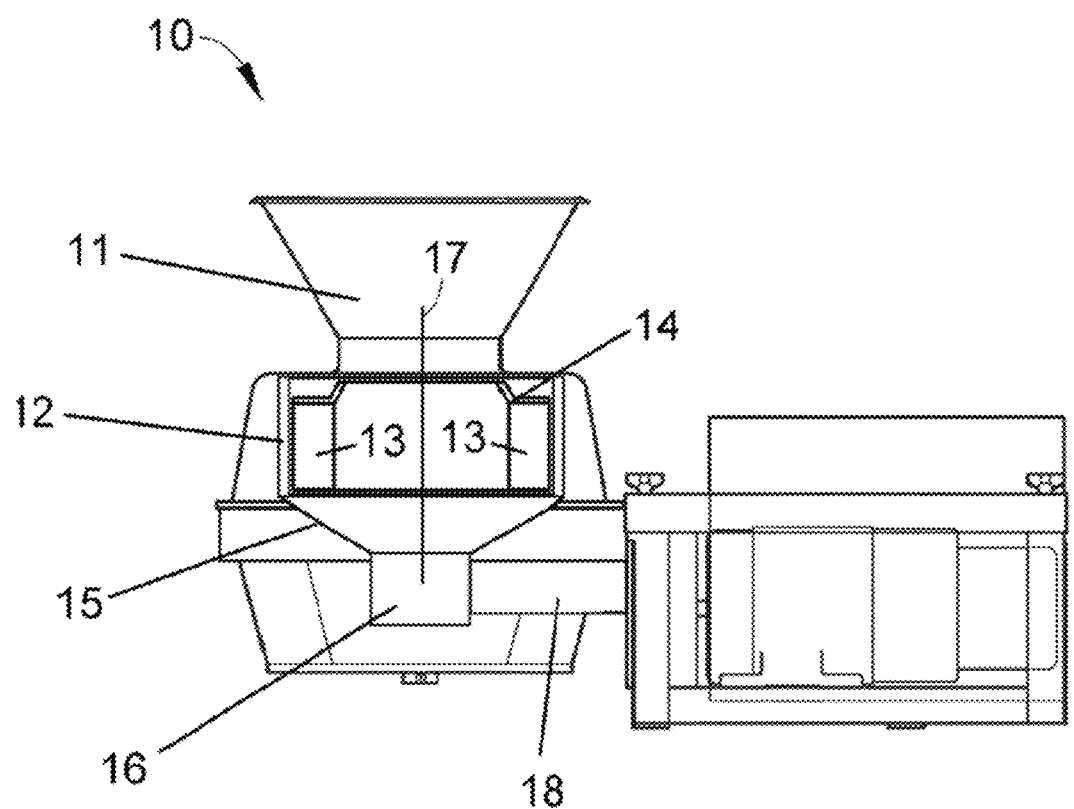
FIG. 1 schematically represents a side view in partial cross-section of a centrifugal-type slicing machine known in the art.

The intended purpose of the following detailed description of the invention and the phraseology and terminology employed therein is to describe what is shown in the drawings, which relate to one or more nonlimiting embodiments of the invention, and to describe certain but not all aspects of what is depicted in the drawings. The following detailed description also identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

Figure 2A:
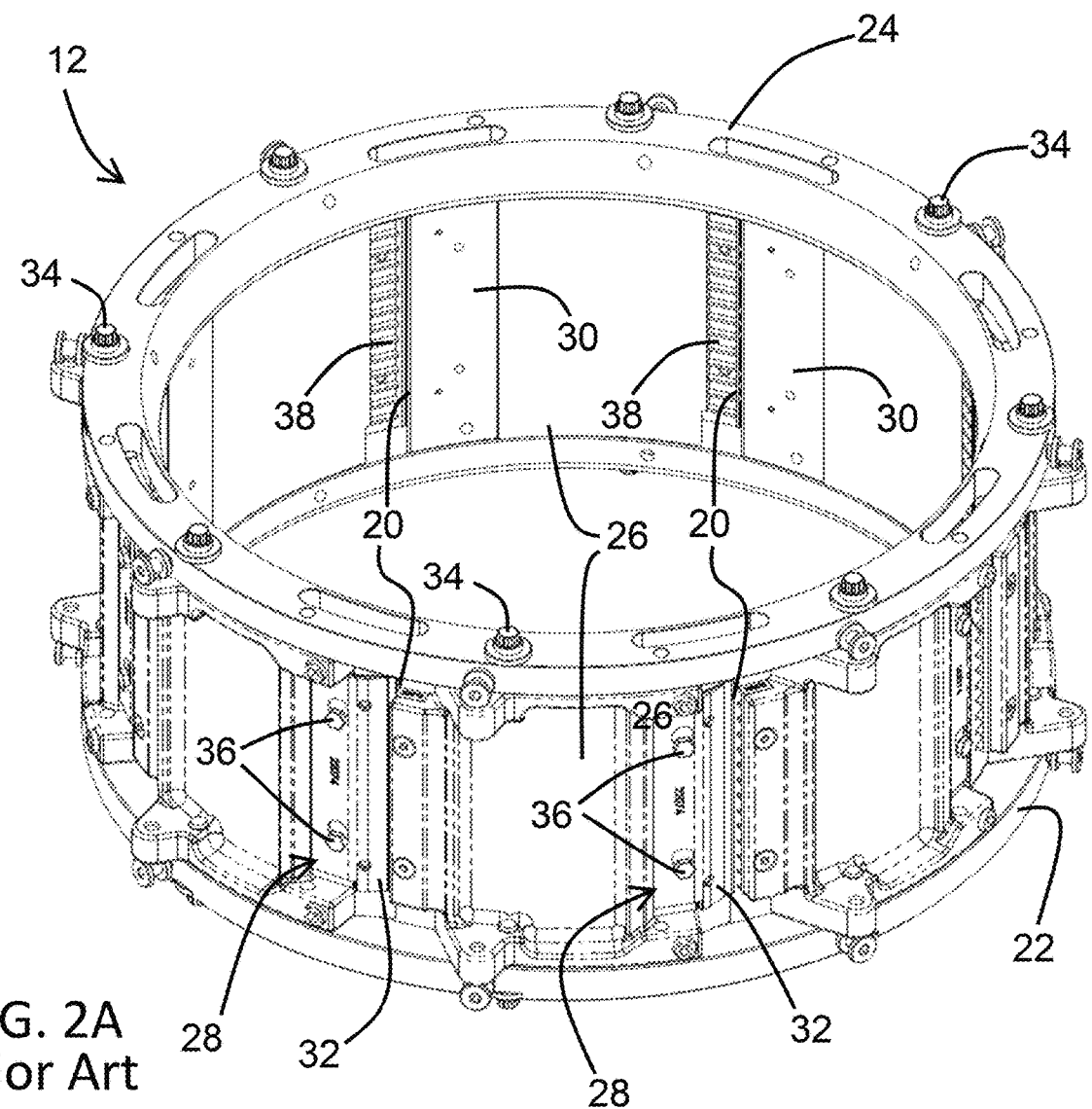
FIGS. 2A and 2B are, respectively, isolated and fragmentary bottom views representing details of a cutting head that has found use in slicing machines of the type represented in FIG. 1.
Figure 2B:
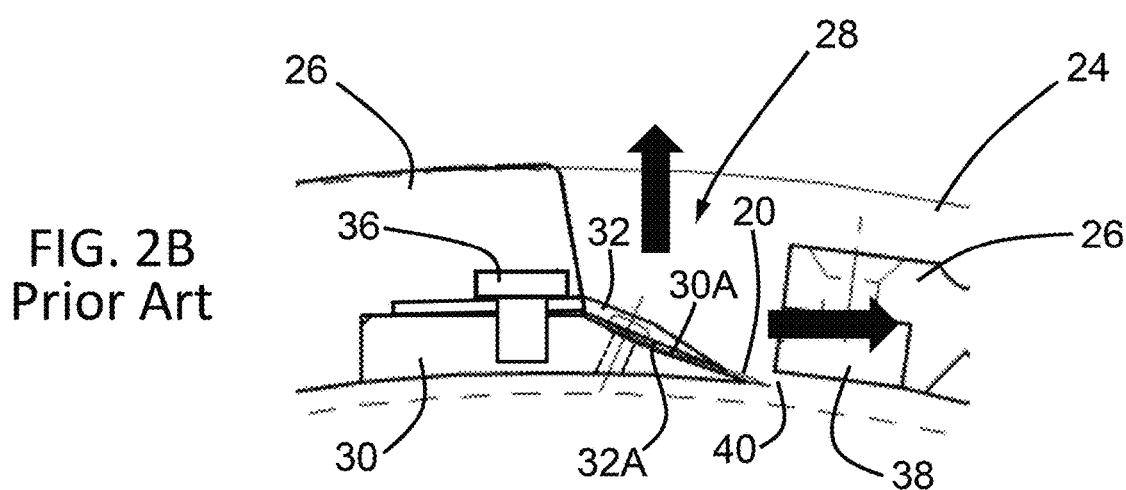
Figure 3:
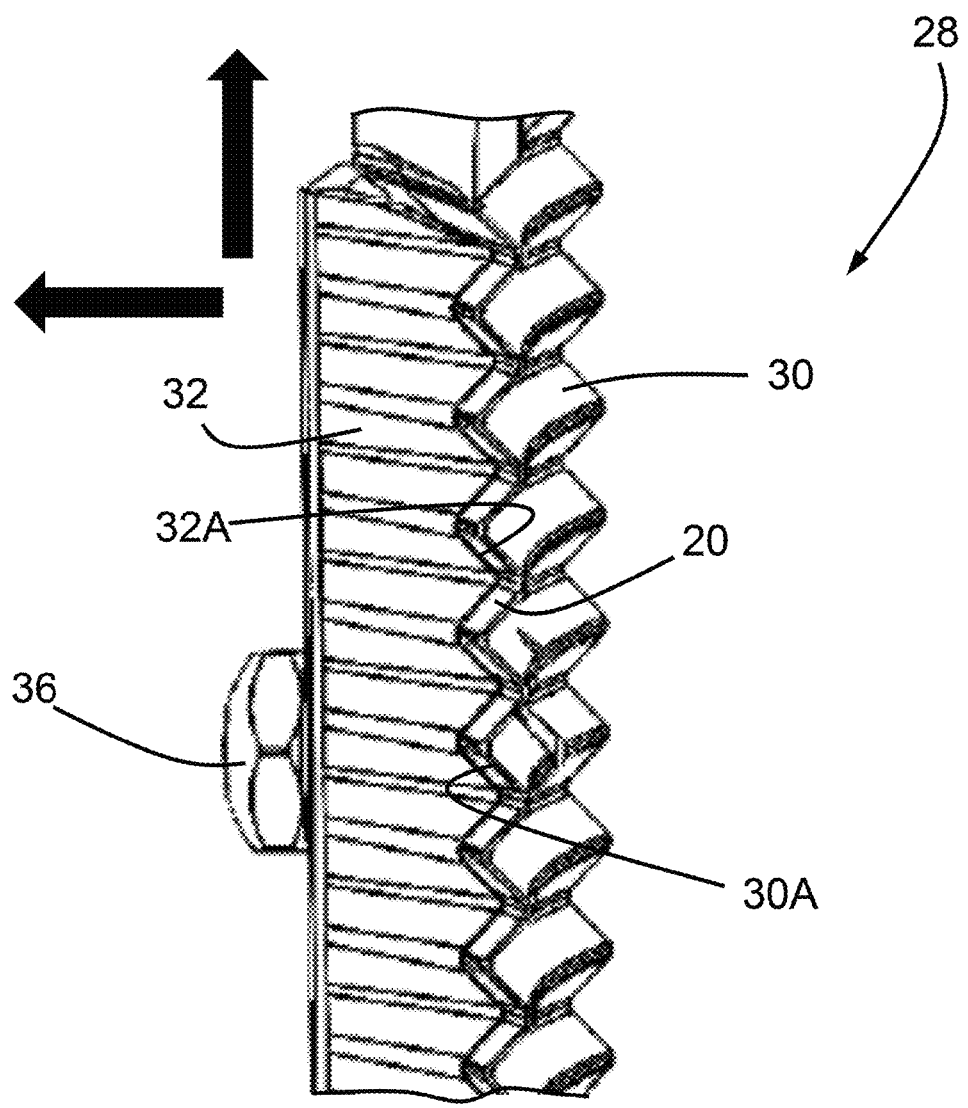
FIG. 3 is a circumferential view of a knife assembly capable of use with the cutting head of FIGS. 2A and 2B.
Figure 7:
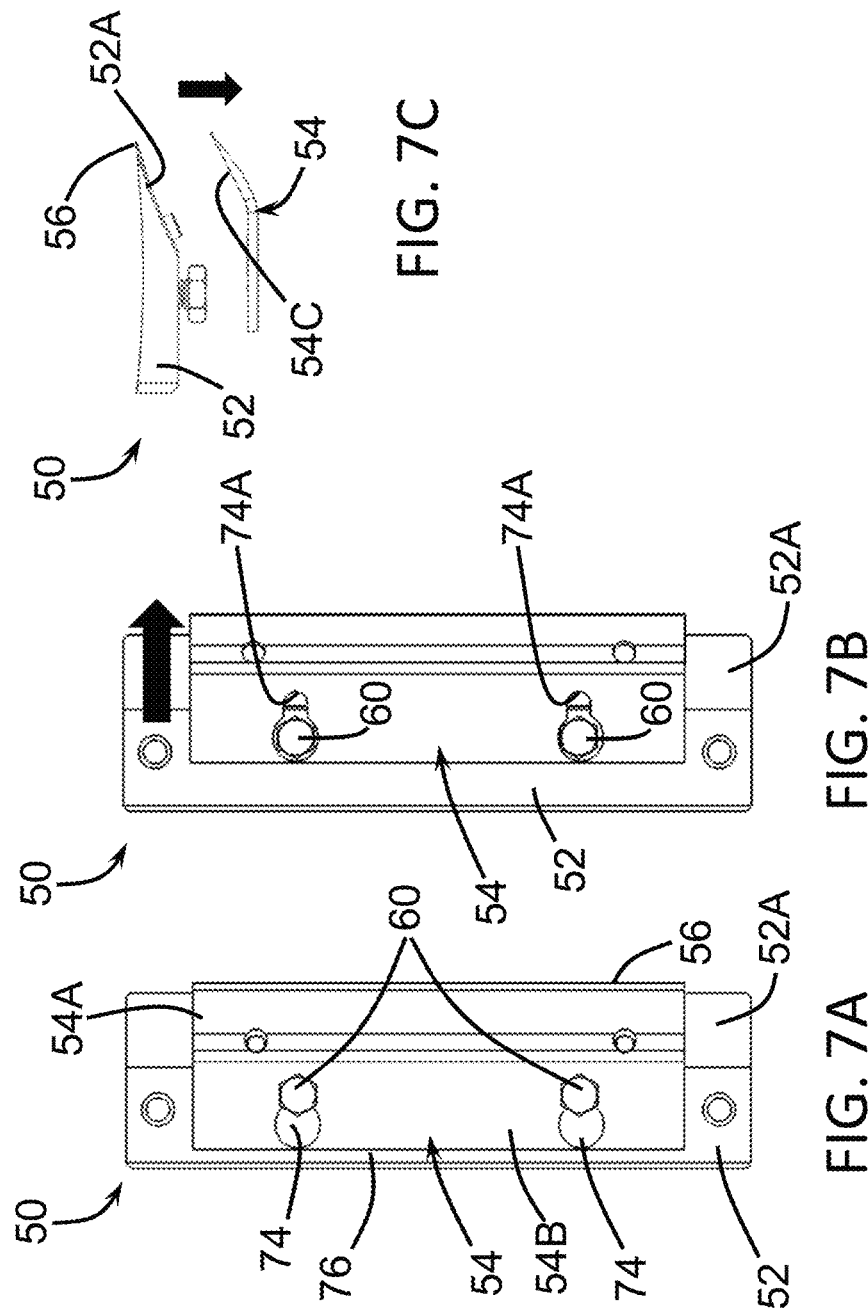

FIGS. 4A through 31 schematically represent nonlimiting embodiments of knife assemblies and components thereof that are capable of use with a variety of cutting machines, including the centrifugal-type slicing machine 10 depicted in FIG. 1 and the cutting head of FIG. 2A, and in some instances may be a replacement or modification of knife assemblies and components for such machines. As a matter of convenience, the knife assemblies will be illustrated and described hereinafter in reference to the slicing machine 10 of FIG. 1 equipped with an annular-shaped cutting head 12 as described in reference to FIGS. 1 and 2A, and as such the following discussion will focus primarily on certain aspects of knife assemblies that will be described in reference to the slicing machine 10 and cutting head 12, whereas other aspects not discussed in any detail below may be, in terms of structure, function, materials, etc., essentially as was described in reference to FIGS. 1 and 2A. However, it will be appreciated that the teachings of the invention are also generally applicable to other types of cutting machines. Moreover, though such machines are particularly well suited for slicing food products, it is within the scope of the invention that impellers described herein could be utilized in cutting machines that cut a wide variety of other types of materials.

To facilitate the description provided below of the knife assemblies represented in the drawings, relative terms may be used in reference to the orientation of the knife assemblies within an annular-shaped cutting head, as represented and described in reference to FIGS. 1 and 2A. On the basis of the coaxial arrangement of the cutting head 12 and impeller 14 in FIG. 1, relative terms including but not limited to "axial," "circumferential," "radial," etc., and related forms thereof may also be used below to describe the nonlimiting embodiments represented in the drawings. All such relative terms are useful to describe the knife assemblies depicted in FIGS. 4A through 31, but should not be otherwise interpreted as limiting the scope of the invention. Furthermore, as used herein, "leading" (and related forms thereof) refers to a position on the cutting head 12 (or a component thereof) that is circumferentially ahead of or precedes another in the direction of rotation of the impeller 14 when assembled with and rotating within a cutting head 12, whereas "trailing" (and related forms thereof) refers to a position on the cutting head 12 (or a component thereof) that circumferentially follows or succeeds another relative to the direction of rotation of the impeller 14. As such, the cutting head 12 can be characterized as having a leading direction, a trailing direction opposite the leading direction, an axial direction perpendicular to the leading and trailing directions, and a radial direction perpendicular to the leading, trailing, and radial directions.

For convenience, consistent reference numbers are used throughout FIGS. 4A through 31 to identify the same or functionally related/equivalent elements of the various embodiments of knife assemblies represented in the drawings.

FIGS. 4A through 9D schematically represent different methods by which a clamp can be removed from a knife assembly mounted to a cutting head of a slicing machine, such as but not limited to the slicing machine of FIG. 1. Though shown as secured with threaded fasteners (bolts), the clamps depicted in FIGS. 4A through 9D may be secured by other means, as nonlimiting examples, various types of fasteners, levers and/or cams.

FIGS. 4A, 4B, and 4C are a series of fragmentary side views of a nonlimiting embodiment of a knife assembly 50 that is represented as comprising a knife holder 52 and a clamp 54 securing a flat knife 56 on a knife support surface 52A of the knife holder 52. As previously noted, a "flat" knife refers to a knife 56 that has a straight cutting edge and is substantially flat between its oppositely-disposed cutting and trailing edges, while a "shaped" knife refers to a knife 56 that does not have a straight cutting edge and is not substantially flat between its cutting and trailing edges. At least the portion of the knife support surface 52A beneath the knife 56 in FIGS. 4A through 4C preferably has a shape complementary to the knife 56. Though other mounting arrangements are foreseeable and within the scope of the invention, it should be understood that the knife holder 52 depicted in FIGS. 4A, 4B, and 4C is configured to be mounted to a shoe 26 and between support rings 22 and 24 of the cutting head 12, generally as represented in FIG. 2A. The clamp 54 is indicated as comprising a knife-engaging portion 54A that forms a leading edge of the clamp 54, physically contacts the knife 56, and therefore has a shape that is complementary to the knife 56. The clamp 54 further comprises a base portion 54B that forms a trailing edge 76 of the clamp 54 and is configured to be engaged by means adapted to secure the clamp 54 to the knife holder 52 and apply a clamping load to the clamp 54 when the clamp 54 is in a clamping position depicted in FIG. 4A. In FIGS. 4A, 4B, and 4C, such means is represented as threaded fasteners 60 (in this particular example, bolts) that pass through the clamp 54 and are threaded into the knife holder 52. The knife-engaging and base portions 54A and 54B of the clamp 54 are not coplanar, enabling the knife-engaging portion 54A to more closely coincide with the orientation of the knife 56 on the knife support surface 52A of the knife holder 52.

Loosening the fasteners 60 removes the clamping load that secures the clamp 54 in the clamping position of FIG. 4A. The shafts (not visible) of the fasteners 60 are received in keyway slots 74, which are narrower than the heads of the fasteners 60 so that the clamping load can be applied by tightening the fasteners 60 so that their heads engage the base portion 54B along the edges of the slots 74. The slots 74 are configured so that the clamp 54 can be removed from the knife holder 52 by loosening the fasteners 60 without requiring complete removal of the fasteners 60 from the knife holder 52. The keyway slots 74 are formed in the base portion 54B of the clamp 54 to be contiguous with the trailing edge 76 of the clamp 54 and extend toward (but shown as terminating short of) the knife-engaging portion 54A of the clamp 54 to form an interior distal edge 74A (FIGS. 4B and 4C) within each slot 74. Each slot 74 is represented as having a constant width along its entire length, though it is foreseeable that any of the slots 74 could be defined to have wider and narrower portions. As evident from FIGS. 4A, 4B, and 4C, the distal edges 74A of the slots 74 serve as stops that prevent the clamp 54 from being removed from the knife assembly 50 by being translated in the circumferential trailing direction (leftward in FIGS. 4A, 4B, and 4C) of the cutting head 12. However, the slots 74 are configured to enable the clamp 54 to be removed from the knife assembly 50 by translating the clamp 54 in the leading direction (rightward as indicated by the arrows in FIGS. 4B and 4C) of the cutting head 12 so that the fasteners 60 are no longer within the slots 74 and the clamp 54 is freed from the knife holder 52 (FIG. 4B). In particular, translating the clamp 54 in the leading direction causes the knife-engaging portion 54A, which forms the leading edge of the clamp 54, has a shape that is complementary to the knife 56, and physically contacts the knife 56 when in the clamping position (FIG. 4A), to no longer contact the knife 56 in the release position (FIG. 4B). From the release position, translation of the clamp 54 in the leading direction can continue as represented in FIG. 4C, or the clamp 54 can be lifted from the knife assembly 50 in a radial direction of the cutting head 12. Once released by the complete removal of the clamp 54 (FIG. 4C), the underlying knife 56 is exposed and may also be removed. To reinstall the clamp 54 on the knife holder 52, the clamp 54 can be translated in the circumferential trailing direction (leftward in FIGS. 4A, 4B, and 4C) to insert the fasteners 60 into their respective slots 74 until the fasteners 60 abut the distal edges 74A of the slots 74 prior to tightening the fasteners 60 to secure the clamp 54 to the knife holder 52 (and in so doing expose the cutting edge of the knife 56). Such a configuration facilitates removal of the knife and cleaning of the knife assembly 50 and its components.

FIGS. 5A and 5B illustrate that the method of removing the clamp 54 as represented in FIGS. 4A, 4B, and 4C is equally applicable to a knife assembly 50 that differs from the assembly 50 of FIGS. 4A, 4B, and 4C by utilizing a shaped knife 56 and being equipped with a clamp 54 (or at least a knife clamping surface 54C on the knife-engaging portion 54A of the clamp 54) and knife holder 52 (or at least the knife support surface 52A of the knife holder 52) that have shapes complementary to the shaped knife 56. In this example, the knife 56 is a corrugated knife 56 of a type capable of producing corrugated, strip-cut, shredded, or granulated products. FIG. 5A shows a clamping position in which the knife 56 is clamped to the knife support surface 52A of the knife holder 52 as a result of the clamp 54 being secured with a fastener 60 to the knife holder 52, and FIG. 5B shows a release position in which the fastener 60 has been sufficiently loosened to enable the clamp 54 to be translated in the leading direction (rightward as indicated by the horizontal arrow in FIG. 5B). As evident from FIG. 5B, the knife-engaging portion 54A of the clamp 54, which forms the leading edge of the clamp 54 and has the knife clamping surface 54C whose shape is complementary to the knife 56 and physically contacts the knife 56 when in the clamping position (FIG. 5A), no longer contacts the knife 56 in the release position (FIG. 5B). From the release position, further translation of the clamp 54 in the circumferential leading direction of the cutting head 12 can continue in the same manner as represented in FIG. 4C, or the clamp 54 can be lifted from the knife assembly 50 in a radial direction of the cutting head 12 (indicated by the vertical arrow in FIG. 5B), or translated in the axial direction of the cutting head 12 (in a direction perpendicular to the vertical and horizontal arrows in FIG. 5B).

FIG. 6 is a circumferential view of the knife assembly 50 of FIGS. 5A and 5B looking in the trailing direction, such that the leading edges of the knife 56, knife holder 52, and clamp 54 are visible. FIG. 6 corresponds to the condition of the knife assembly 50 shown in FIG. 5B, and as such depicts the release position in which the fastener 60 (not shown) has been sufficiently loosened to enable the clamp 54 to be translated in the leading direction. As evident from FIG. 6, translating the clamp 54 in the leading direction causes its knife clamping surface 54C to disengage the complementary-shaped knife 56, and as such the clamp 54 can be freely translated relative to the knife 56 and knife holder 52 in the axial direction (indicated by the vertical arrow in FIG. 6) of the cutting head 12. As a result, the clamp 54 can be fully removed from the knife assembly 50 after being translated in the leading direction as shown in FIGS. 5B and 6.

In view of similarities between the embodiments of FIGS. 4A through 6 and FIGS. 7A through 9D, the following discussion of FIGS. 7A through 9D will focus primarily on aspects of their respective embodiments that differ from the embodiments of FIGS. 4A through 6 in some notable or significant manner. Other aspects of the embodiments of FIGS. 7A through 9D not discussed in any detail can be, in terms of structure, function, materials, etc., essentially as was described for the embodiments of FIGS. 4A through 6.

FIGS. 7A and 7B are a series of fragmentary side views of another nonlimiting embodiment of a knife assembly 50, and FIG. 7C is a top view of the same knife assembly 50. FIG. 7A depicts the clamping position in which the clamp 54 is secured with fasteners 60 whose shafts (not visible) are received in slots 74 that have wider and narrower portions. The wider portions of the slots 74 extend toward but are not contiguous with the trailing edge 76 of the clamp 54, and the narrower portions of the slots 74 extend toward (but terminate short of) the knife-engaging portion 54A of the clamp 54, forming an interior distal edge 74A (FIG. 7B) within each slot 74 that serves as a stop to prevent the clamp 54 from being removed from the knife assembly 50 by being translated in the circumferential trailing direction (leftward in FIGS. 7A, 7B, and 7C) of the cutting head 12. The narrower portions of the slots 74 are narrower than the heads of the fasteners 60, enabling the fasteners 60 to secure the clamp 54 to the knife holder 52 in the clamping position. The wider portions of the slots 74 are larger than the heads of the fasteners 60 (FIG. 7B), permitting the clamp 54 to be removed from the knife holder 52 by loosening the fasteners 60 and translating the clamp 54 in the leading direction (rightward in FIGS. 7A and 7B as indicated by the arrow in FIG. 7B) without requiring removal of the fasteners 60 from the knife holder 52. In FIG. 7B, which depicts the release position, the heads of the fasteners 60 are aligned with the wider portions of the slots 74 and able to pass through the slots 74 as the clamp 54 is lifted from the knife assembly 50 in a radial direction (indicated by the arrow in FIG. 7C) of the cutting head 12.

On the basis of FIGS. 5A and 5B, it can be appreciated that the method of removing the clamp 54 as represented in FIGS. 7A, 7B, and 7C is equally applicable to a knife assembly 50 that utilizes a shaped knife 56 and a clamp 54 and knife holder 52 that have complementary-shaped support and clamping surfaces 52A and 54C, since translating the clamp 54 in the leading direction disengages the knife clamping surface 54C of the clamp 54 from the complementary-shaped knife 56.

FIGS. 8A through 8C are similar to FIGS. 7A through 7C, representing another nonlimiting embodiment of a knife assembly 50 that differs from the embodiment of FIGS. 7A through 7C as a result of the wider portions of its slots 74 extending toward and being open to and contiguous with the trailing edge 76 of the clamp 54. As with the embodiment of FIGS. 7A through 7C, narrower portions of the slots 74 are narrower than the heads of the fasteners 60, enabling the fasteners 60 to secure the clamp 54 to the knife holder 52 in a clamping position, and the clamp 54 can be removed from the knife holder 52 by loosening the fasteners 60 and translating the clamp 54 in the leading direction (rightward in FIGS. 8A through 8C as indicated by the arrow in FIG. 8B) without requiring removal of the fasteners 60 from the knife holder 52. Thereafter, FIG. 8B evidences that in the release position, the heads of the fasteners 60 are aligned with the wider portions of the slots 74 and able to pass through the slots 74 so that the clamp 54 can be lifted from the knife assembly 50 in a radial direction (indicated by the arrow in FIG. 8C) of the cutting head 12. Alternatively, because the wider portions of the slots 74 are open to and contiguous with the trailing edge 76 of the clamp 54, from the release position of FIG. 8B the clamp 54 may be further translated in the leading direction in the same manner as represented in FIG. 4C and discussed in reference to FIG. 5B.

It can be appreciated that the method of removing the clamp 54 as represented in FIGS. 8A through 8C is equally applicable to a knife assembly 50 that utilizes a shaped knife 56 and equipped with a clamp 54 and knife holder 52 that have complementary-shaped support and clamping surfaces 52A and 54C, since translating the clamp 54 in the leading direction disengages the knife clamping surface 54C of the clamp 54 from the complementary-shaped knife 56.

FIGS. 9A through 9D are similar to FIGS. 7A through 7C, representing another nonlimiting embodiment of a knife assembly 50 that differs from the embodiment of FIGS. 7A through 7C as a result of the slots 74 being L-shaped. As a result, from the clamping position of FIG. 9A, the clamp 54 can be removed from the knife holder 52 by loosening the fasteners 60, translating the clamp 54 in the leading direction (rightward in FIG. 9B as indicated by the arrow) of the cutting head 12, and then translating the clamp 54 in the axial direction (downward in FIG. 9C as indicated by the arrow) of the cutting head 12 to arrive at the release position (FIG. 9C). Thereafter, the clamp 54 can be lifted from the knife assembly 50 in a radial direction (indicated by the arrow in FIG. 9D) of the cutting head 12.

Again, it should be appreciated that the method of removing the clamp 54 as represented in FIGS. 9A through 9D is equally applicable to a knife assembly 50 that utilizes a shaped knife 56 and equipped with a clamp 54 and knife holder 52 that have complementary-shaped support and clamping surfaces 52A and 54C. In particular, translating the clamp 54 in the leading direction to the release position of FIG. 9B causes the knife clamping surface 54C of the clamp 54 to disengage from the complementary-shaped knife 56, such that the clamp 54 is able to be translated in the axial direction (downward in FIG. 9C as indicated by the arrow) of the cutting head 12.

Figure 8:
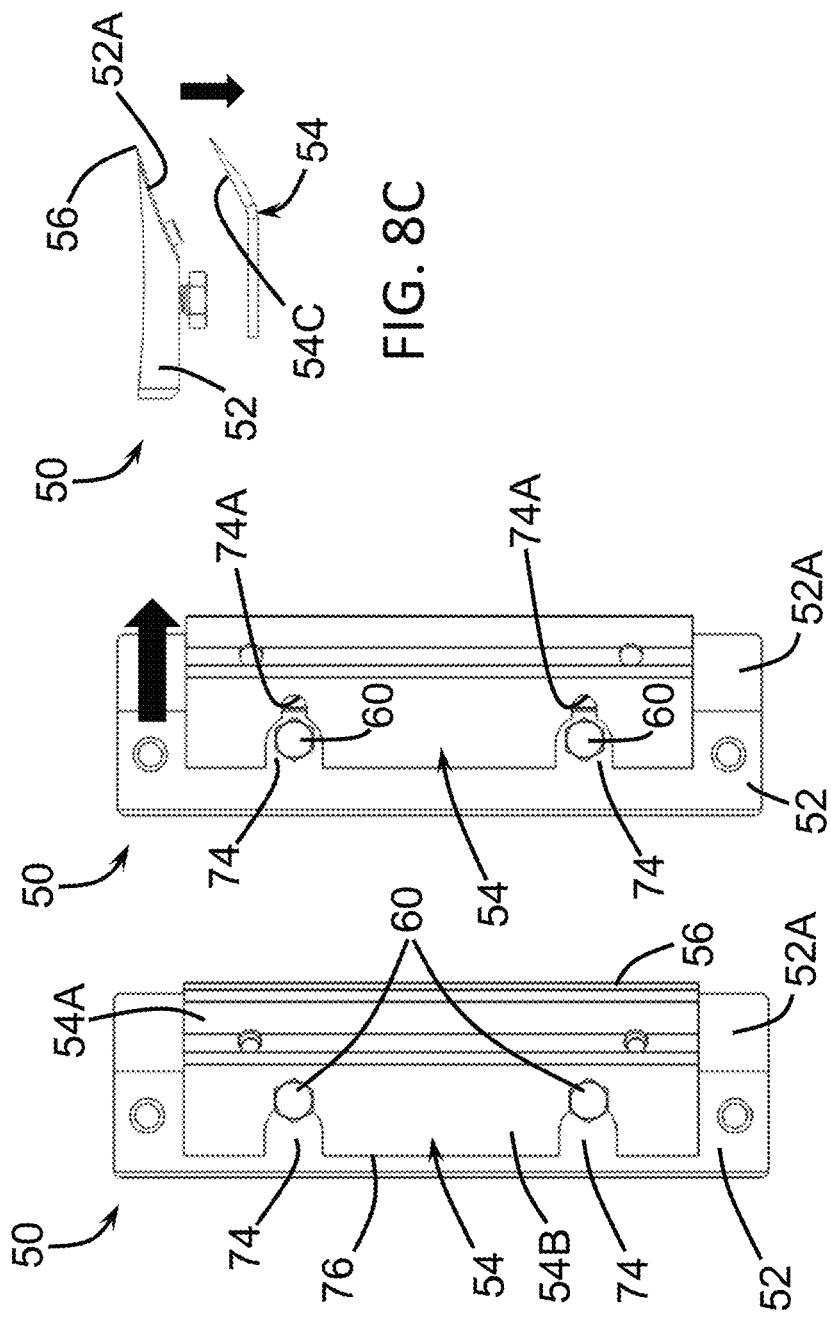
Figure 9:
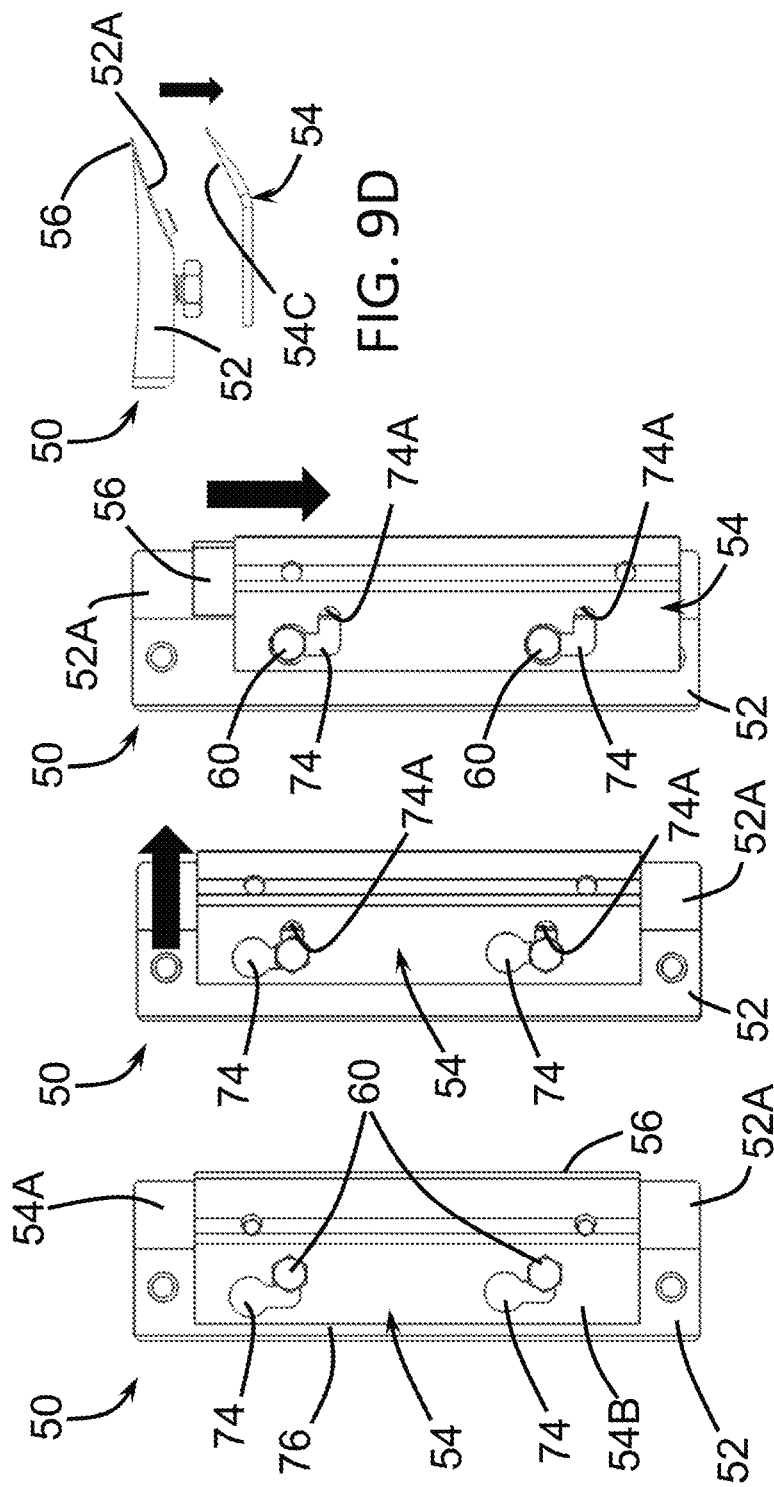
Figure 10:
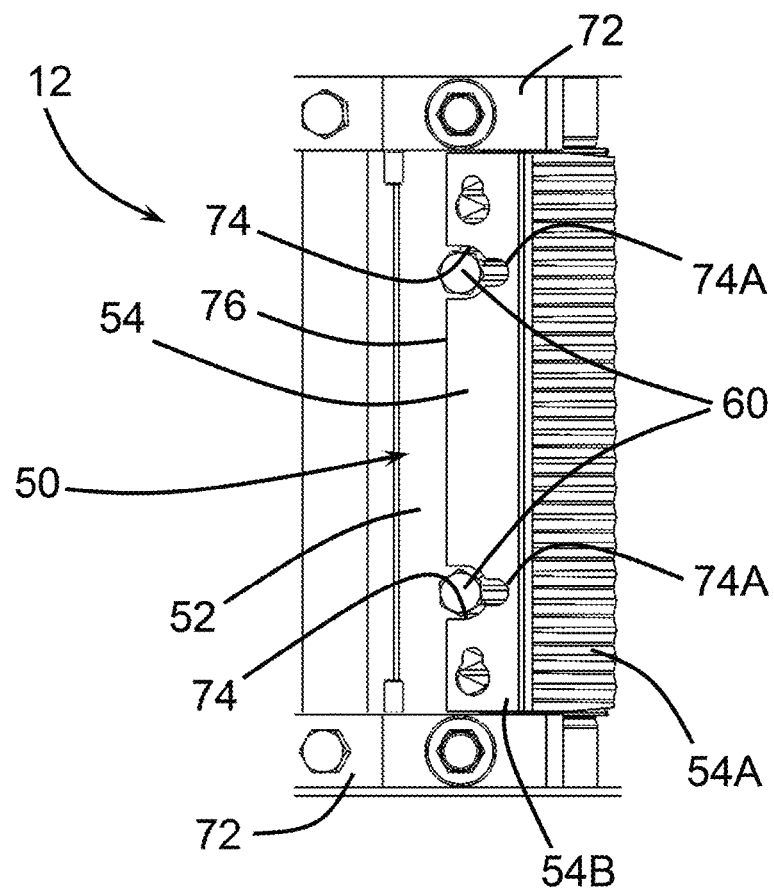
FIG. 10 is a fragmentary side view of a knife assembly of a slicing machine, such as but not limited to the slicing machine of FIG. 1, and represents the knife assembly as comprising a knife holder and a clamp retaining a shaped knife on the knife holder.

FIG. 10 is a fragmentary side view of an embodiment of a knife assembly 50 similar to that of FIGS. 8A through 8C. The knife assembly 50 is represented as mounted to a cutting head 12 of a slicing machine, such as but not limited to the slicing machine of FIG. 1, and mounted by and between a pair of bases 72 mounted to support rings (not shown) of the cutting head 12. The knife assembly 50 is further represented as configured to utilize a shaped knife (concealed by the clamp 54), which is clamped by a clamp 54 to a knife support surface (also concealed by the clamp 54) of a knife holder 52, such that at least portions of the knife support surface of the knife holder 52 and a knife clamping surface of the clamp 54 have shapes complementary to the shaped knife. Other aspects of the knife assembly 50 are generally as was described for the embodiment of FIGS. 8A through 8C. As such, and consistent with the embodiments of FIGS. 4A through 9D, distal edges 74A of slots 74 in the clamp 54 serve as stops that prevent the clamp 54 from being removed from the knife assembly 50 by being translated in the circumferential trailing direction (leftward in FIG. 10) of the cutting head 12, but the clamp 54 can be removed from the knife assembly 50 by being translated in the leading direction (rightward in FIG. 10) of the cutting head 12. In the nonlimiting embodiment portrayed in FIG. 10 (and consistent with the embodiment of FIGS. 8A through 8C), the clamp 54 is translated in the leading direction so that the fasteners 60 are no longer aligned with the narrower portions of the slots 74 and instead are aligned with the wider portions of the slots 74 to permit the fasteners 60 to pass through the slots 74 as the clamp 54 is lifted from the knife assembly 50 in the radial direction of the cutting head 12. Once released by the removal of the clamp 54, the underlying knife 56 may also be removed.

Alternatively, to secure the clamp 54 to the knife holder 52, the clamp 54 would be translated to the left (as viewed in FIG. 10) to insert the fasteners 60 into a narrowed section of each slot 74 until they abut the distal edges 74A of the slots 74 prior to tightening the fasteners 60 to secure the clamp 54 to the knife holder 52 (and in so doing expose the cutting edge of the knife).

Figure 11:
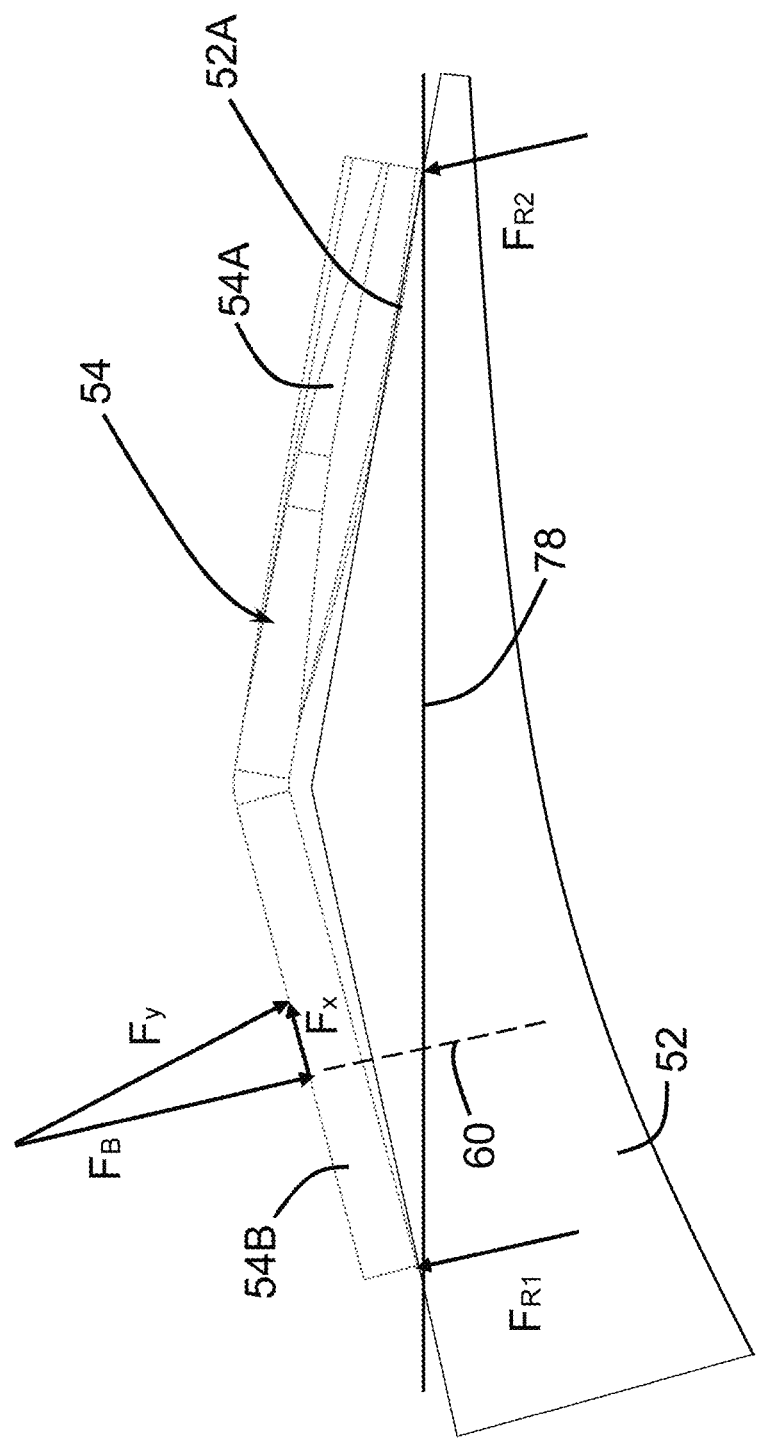
FIG. 11 schematically represents an end view of the clamp of FIG. 10, and diagrammatically represents forces acting on the clamp when secured to the knife holder as shown in FIG. 10.

FIG. 11 schematically represents an end view of the clamp 54 of FIG. 10 and diagrammatically represents forces acting on the clamp 54 when secured to the knife holder 52 as shown in FIG. 10 (the knife is omitted for clarity). The forces acting on the clamp 54 in FIG. 11 are also illustrative of the forces acting on the clamps 54 represented in each of the embodiments of FIGS. 4A through 9D. As evident from FIG. 11, the fasteners 60 apply a force FB to the base portion 54B of the clamp 54 coincident with the axis of the fastener 60, inducing resultant forces $F_{R1}$ and $F_{R2}$ along a contact surface 78 representative of the surfaces of the knife holder 52 and knife contacted by the clamp 54. Because the knife-engaging and base portions 54A and 54B of the clamp 54 are not coplanar, the bolt force FB is not perpendicular to the base portion 54B, such that the bolt force FB has x and y components (respectively, parallel and normal to the outer surface of the clamp 54) identified as $F_x$ and $F_y$, respectively. As evident from FIGS. 10 and 11, whereas $F_y$ is primarily responsible for the clamping load applied by the clamp 54 to a knife, $F_x$ pushes the clamp 54 in the leading direction of the cutting head 12 (rightward as viewed in FIGS. 10 and 11). If $F_x$ is greater than the force of friction between the clamp 54 and the knife holder 52, $F_x$ is capable of causing the clamp 54 to translate rightward as and after the fasteners 60 are tightened to secure the clamp 54. Torque reaction forces can also rotate the clamp 54 out of position if such forces are greater than the frictional forces between the clamp 54 and knife holder 52. Any resulting translation or shift could result in undesirable movement of the knife relative to the knife holder 52.

Figure 12:
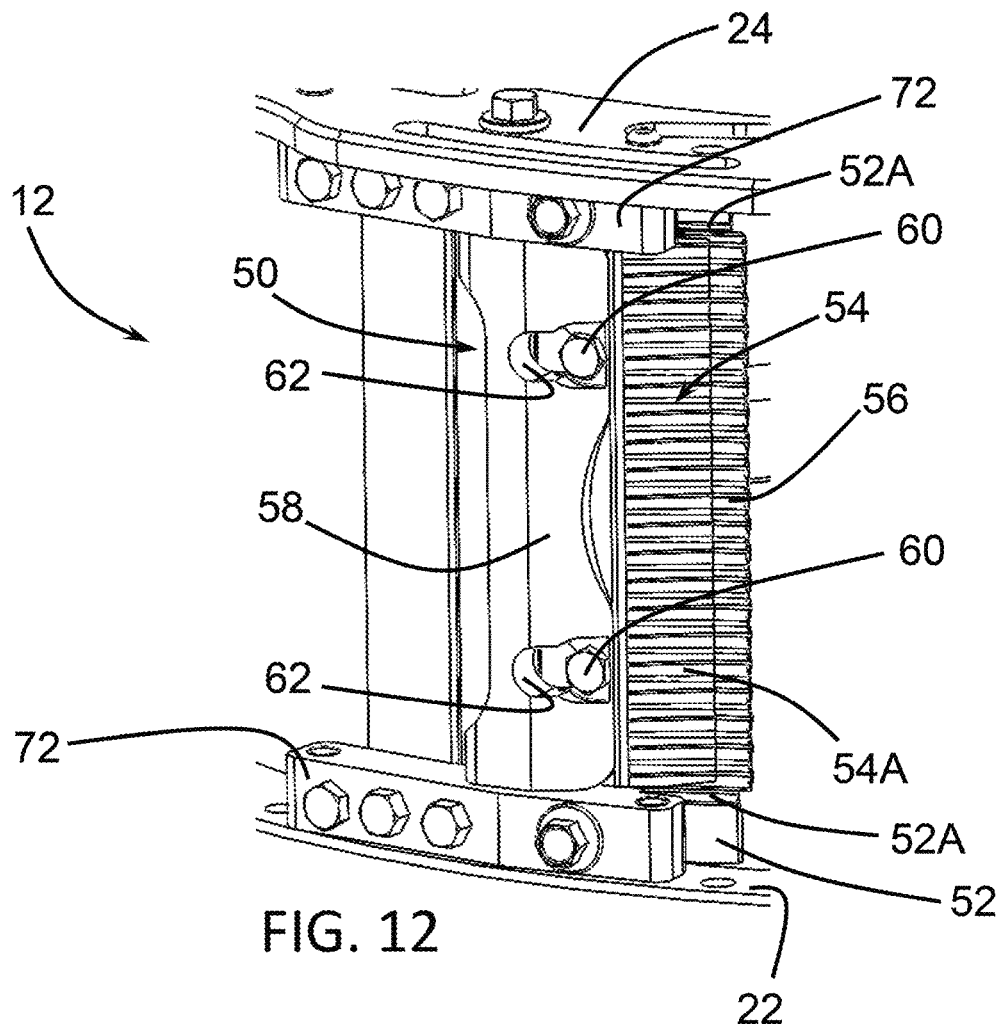
FIG. 12 is a fragmentary side view of a knife assembly for a slicing machine, and represents the knife assembly as comprising a knife holder, a clamp retaining a shaped knife on the knife holder, and a support bar securing the clamp to the knife holder according to a nonlimiting embodiment of the present invention.
Figure 13:
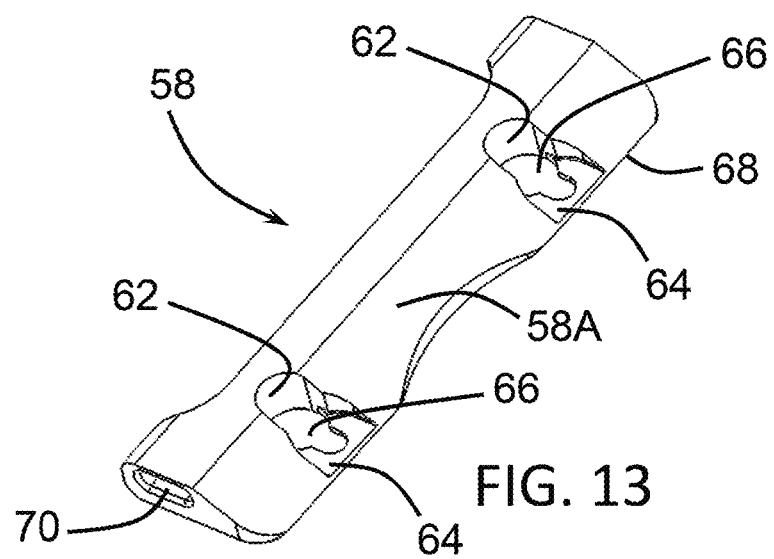
FIG. 13 is an isolated view of the support bar of FIG. 12.

FIG. 12 is a fragmentary side view of the knife assembly 50 of FIG. 10 to which a support bar 58 has been added. As such, the knife assembly 50 is represented as comprising the knife holder 52 and clamp 54 securing a shaped knife 56 on a knife support surface 52A of the knife holder 52. In FIG. 12, the entire knife support surface 52A preferably has a shape complementary to the shaped knife 56. (In FIG. 12, the knife support surface 52A is nearly entirely concealed beneath the knife 56.) The support bar 58 secures the clamp 54 to the knife holder 52 in cooperation with the fasteners 60. The heads of the fasteners 60 are received in recesses 62 in an outer surface 58A of the support bar 58. As more readily evident from the isolated view of the support bar 58 in FIG. 13, each recess 62 defines a recessed surface 64 in which a keyhole slot 66 is defined having wider and narrower portions, with the narrower portion in proximity to a leading edge 68 of the support bar 58. In the nonlimiting embodiment shown, the slots 66 are not contiguous with the leading edge 68 of the support bar 58, nor contiguous with any other peripheral edge of the support bar 58. The heads of the fasteners 60 are sized to pass through the wider portions of the slots 66, but cannot pass through the narrower portions of the slots 66 as a result of being larger in diameter than the widths of the narrower portions of the slots 66. As such, by sufficiently threading the fasteners 60 into the knife holder 52 while aligned with the narrower portions of the slots 66, heads of the fasteners 60 apply a clamping force directly to the recessed surfaces 64 of the support bar 58, which is transmitted through the clamp 54 to the knife 56, by which the knife 56 is clamped to the knife holder 52. As also shown in FIG. 10, the knife-engaging portion 54A of the clamp 54 is at least adjacent a leading edge of the clamp 54, in the embodiment shown is at and defines the leading edge of the clamp 54, and at least part of the knife-engaging portion 54A has a shape complementary to the shaped knife 56 and transmits the clamping force to the knife 56 in proximity to a leading edge of the knife holder 52, from which the knife 56 protrudes as seen in FIG. 12. With this arrangement, the clamp 54 is not physically attached to the support bar 58 (FIG. 14), but instead is clamped by the support bar 58 to the knife holder 52, which in turn causes the clamp 54 to clamp the knife 56 to the knife holder 52.

The support bar 58 has a pair of pivot recesses 70 (one of which is visible in FIG. 13) by which the support bar 58 is pivotally coupled to the pair of bases 72 mounted to the support rings 22 and 24 of the cutting head 12. For example, each base 72 may be equipped with a pin (not shown) that is received in a corresponding one of the pivot recesses 70 of the support bar 58. As evident from FIG. 13, the pivot recesses 70 are oblong, allowing for translation movement of the support bar 58 relative to the bases 72 (generally in a circumferential direction of the cutting head 12) as well as a pivot motion about a pivot axis (generally parallel to the center axis of the cutting head 12). As such, the support bar 58 is also configured to translate and pivot relative to other components of the knife assembly 50, including the knife holder 52, clamp 54, and knife 56.

Figure 14:
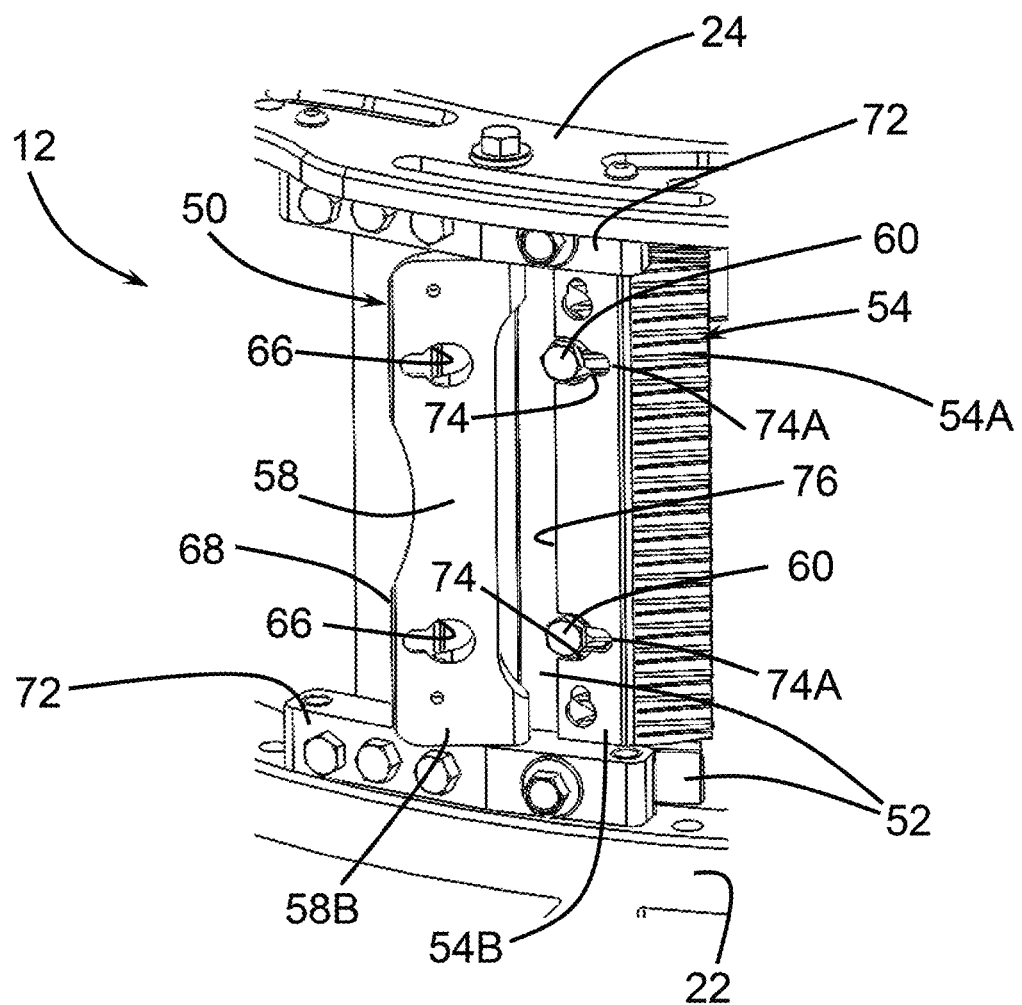
FIG. 14 is a fragmentary side view of the knife assembly of FIG. 12, and represents the support bar rotated out of contact with the clamp according to a nonlimiting aspect of the present invention.

FIG. 14 represents the result of loosening the fasteners 60 to allow the support bar 58 to translate and pivot relative to the bases 72. In particular, FIG. 14 depicts the result of the support bar 58 having been translated relative to the bases 72 so that the fasteners 60 are no longer aligned with the narrower portions of the slots 66 in the support bar 58 and instead are aligned with the wider portions of the slots 66 to permit the fasteners 60 to pass through the slots 66, and then the support bar 58 having been pivoted about its pivot axis to expose the underlying base portion 54B of the clamp 54, which is at least adjacent the trailing edge 76 of the clamp 54 and in the embodiment shown is at and defines the trailing edge 76 of the clamp 54. In FIG. 14, the support bar 58 has been sufficiently pivoted to completely disengage the clamp 54, exposing a lower surface 58B of the support bar 58 that had contacted the clamp 54 in the clamping position depicted in FIG. 12. As also shown and/or discussed in reference to FIG. 10, the clamp 54 can be seen to have keyway slots 74 that are formed in the base portion 54B of the clamp 54 to be contiguous with the trailing edge 76 of the clamp 54 formed by the base portion 54B, and extend toward but terminate short of the knife-engaging portion 54A of the clamp 54, forming an interior distal edge 74A within each slot 74. As with the slots 66 of the support bar 58, each slot 74 is defined to have wider and narrower portions, and in this respect the slots 66 of the support bar 58 may be complementary in size and shape to the slots 74 of the clamp 54. The wider portions of the slots 74 are contiguous with the trailing edge 76 of the clamp 54, and the narrower portions of the slots 74 form the distal edges 74A of the slots 74. As such, and as shown in FIG. 14, the distal edges 74A of the slots 74 serve as stops that prevent the clamp 54 from being removed from the knife assembly 50 by being translated in the trailing direction (leftward in FIG. 14) of the cutting head 12, but the clamp 54 can be removed from the knife assembly 50 by being translated in the leading direction (rightward in FIG. 14) of the cutting head 12 so that the fasteners 60 are no longer aligned with the narrower portions of the slots 74 and instead are aligned with the wider portions of the slots 74 to permit the fasteners 60 to pass through the slots 74 as the clamp 54 is lifted from the knife assembly 50 in the radial direction of the cutting head 12. Once released by the removal of the clamp 54, the underlying knife 56 may also be removed.

Figure 15:
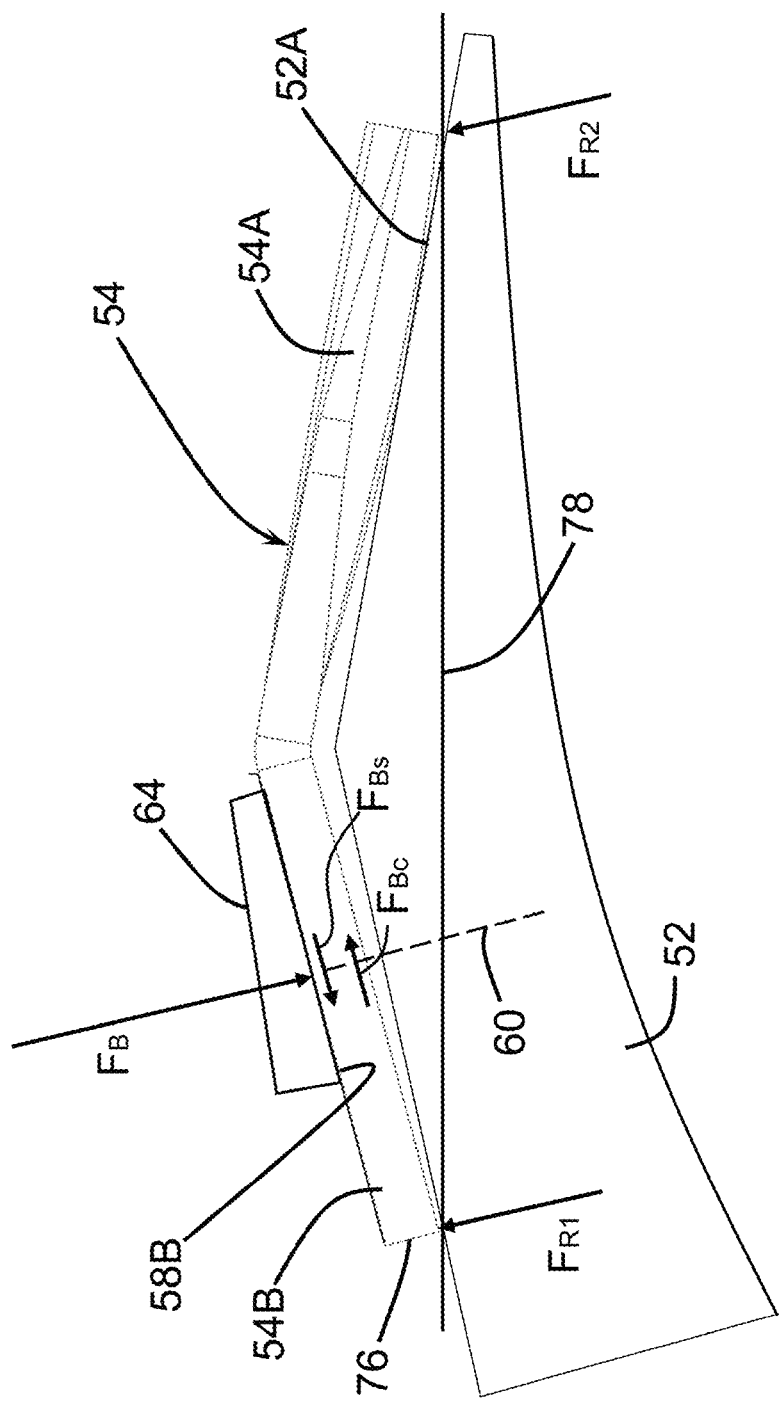
FIG. 15 schematically represents an end view of the clamp and support bar of FIG. 12, and diagrammatically represents forces acting on the clamp when secured to the knife holder with the support bar as shown in FIG. 12.

As evident from FIG. 14 (and similar to the discussion of the clamp 54 in reference to FIG. 10), the knife-engaging portion 54A and base portion 54B of the clamp 54 are not coplanar, enabling the knife-engaging portion 54A to more closely coincide with the orientation of the knife 56. This relationship is exaggerated in FIG. 15 for purposes of illustration, which schematically represents an end view of the clamp 54 and diagrammatically represents forces acting on the clamp 54 when secured to the knife holder 52 as shown in FIG. 12. FIG. 15 also schematically represents the support bar 58 and one of its recessed surfaces 64, which is directly engaged by one of the fasteners 60 (schematically represented in FIG. 15) that secure the clamp 54, knife 56 (not shown in FIG. 15), and support bar 58 to the knife holder 52. As evident from FIG. 15, each fastener 60 applies a force FB to the base portion 54B of the clamp 54 coincident with the axis of the fastener 60, inducing resultant forces FR1 and FR2 along a contact surface 78 representative of the surfaces of the knife holder 52 and knife 56 contacted by the clamp 54. Because the knife-engaging and base portions 54A and 54B of the clamp 54 are not coplanar, the bolt force FB is not perpendicular to the base portion 54B.

As schematically represented in FIG. 15, the recessed surface 64 is intentionally tapered relative to the lower surface 58B of the support bar 58 so that its thickness increases toward the trailing edge of the clamp 54. An effect of the tapered recessed surface 64 is that the bolt force FB induces a surface friction force $F_{Bs}$ as a result of the bolt force FB urging the support bar 58 downward and to the left in FIG. 15 over the surface of the base portion 54B of the clamp 54, but is prevented from doing so by the pivot pins engaging the pivot recesses 70 of the support bar 58. This surface friction force $F_{Bs}$ is applied by the support bar 58 to the clamp 54, and counters a force $F_{Bc}$ transmitted by the fastener 60 to the clamp 54 that would otherwise cause the clamp 54 to slide rightward in FIG. 15 (toward the cutting edge of the knife 56), which would be possible because the slots 74 formed in a base portion 54B of the clamp 54 are contiguous with the trailing edge of the clamp 54. Because the clamp 54 is effectively immobilized by the support bar 58, the position of the clamp 54 relative to the knife 56 is not altered as the fasteners 60 are tightened.

In view of similarities between embodiments represented in the drawings, the following discussion will focus primarily on aspects of the embodiments of FIGS. 16 through 31 that differ from the embodiment of FIGS. 10 through 15 in some notable or significant manner. Other aspects of the embodiments of FIGS. 16 through 31 that are not discussed in any detail may be, in terms of structure, function, materials, etc., essentially as was described for the embodiment of FIGS. 10 through 15.

Figure 16:
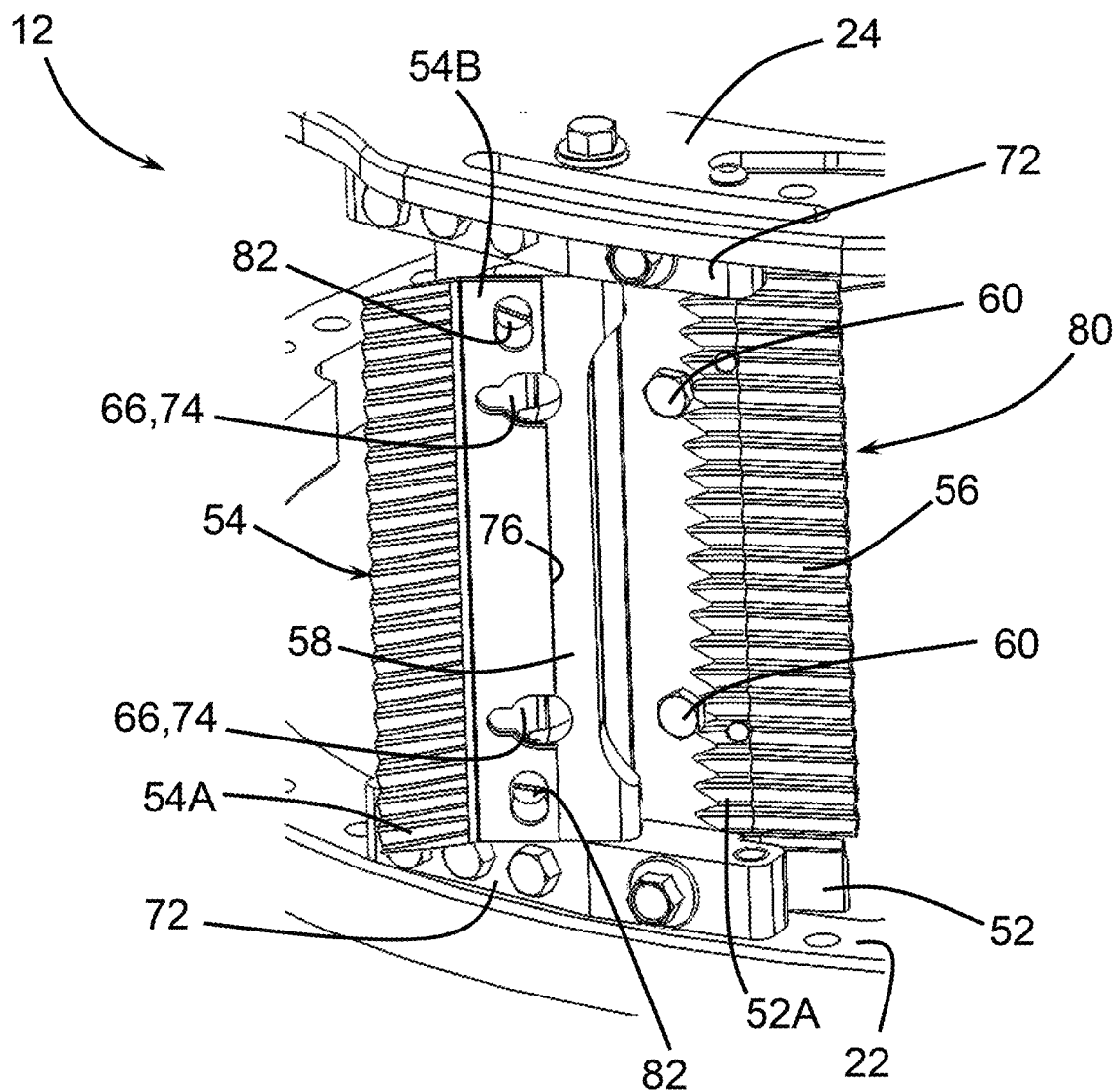
FIG. 16 is a fragmentary side view of a knife assembly that differs from the knife assembly of FIGS. 12 and 14 by the clamp being attached to the support bar according to another nonlimiting embodiment of the present invention.
Figure 17:
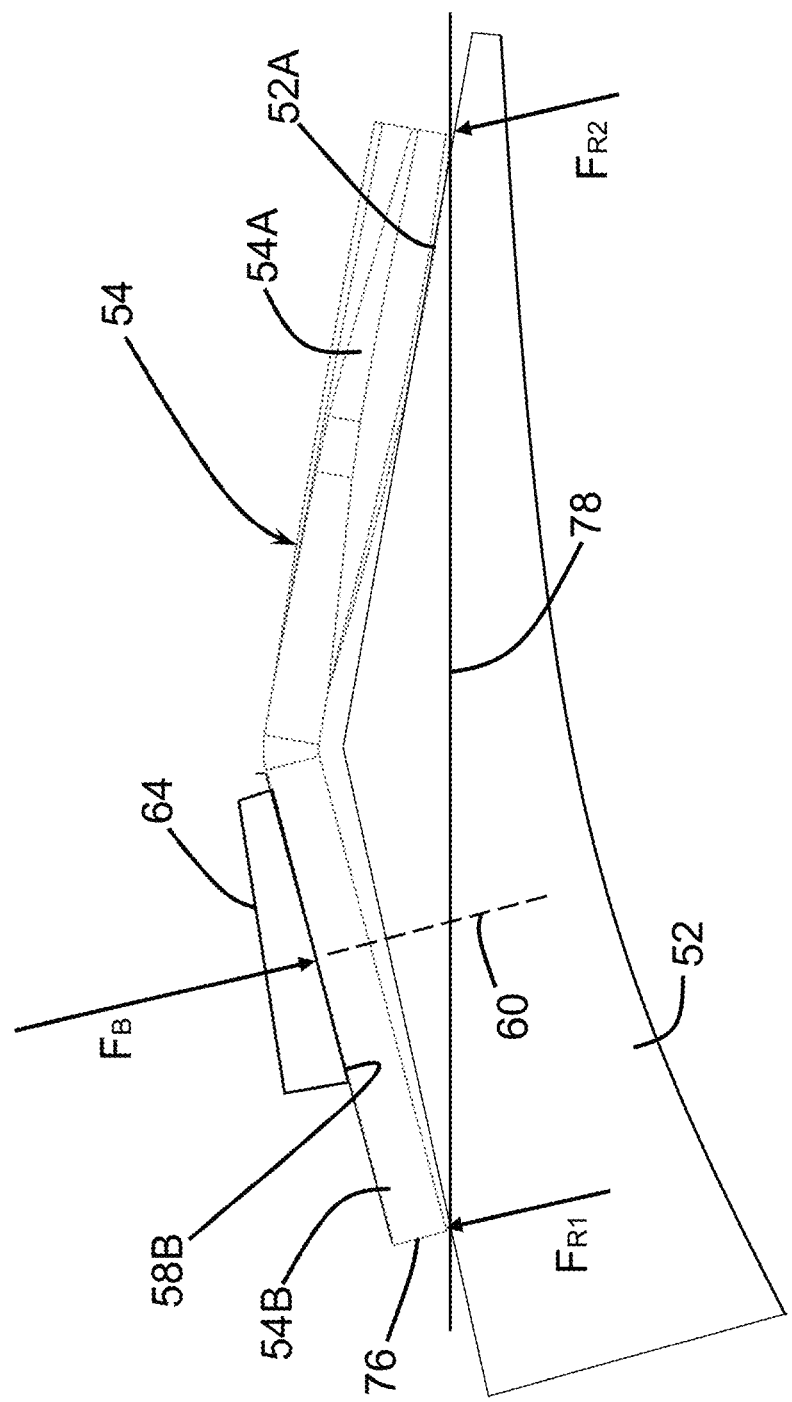
FIG. 17 schematically represents an end view of the clamp and support bar of FIG. 16, and diagrammatically represents forces acting on the clamp when secured to the knife holder with the support bar as shown in FIG. 16.

FIG. 16 is a fragmentary side view of a second embodiment of a knife assembly 80 that differs from the knife assembly 50 of FIGS. 12 and 14 by the clamp 54 being physically attached to the support bar 58 so that the clamp 54 translates and pivots with the support bar 58 relative to the knife holder 52, clamp 54, and shaped knife 56. The means of attaching the clamp 54 to the lower surface 58B of the support bar 58 is represented as screws 82, but it is within the scope of the invention to use any suitable attachment means capable of mounting the clamp 54 to the support bar 58. FIG. 17 schematically represents an end view of the clamp 54 and support bar 58 of FIG. 16, and diagrammatically represents forces acting on the clamp 54 when secured to the knife holder 52 with the support bar 58 as shown in FIG. 16. Because the clamp 54 is attached to the support bar 58 so that the clamp 54 is prevented from moving relative to the support bar 58, the forces $F_{Bs}$ and $F_{Bc}$ are no longer a factor because the support bar 58 ensures that the position of the clamp 54 relative to the knife 56 is not altered as the fasteners 60 are tightened.

FIG. 18 is a fragmentary side view of the cutting head 12 in which a third embodiment of a knife assembly 90 is depicted. As with the embodiments of FIGS. 10 through 17, the knife assembly 90 is shown in FIG. 18 as comprising a knife holder 52 and a clamp 54 securing a shaped knife 56 (concealed by the clamp 54) on the knife support surface (also concealed by the clamp 54) of the knife holder 52. Preferably the entire knife support surface 52A has a shape complementary to the shaped knife 56. Contrary to the prior embodiments, the knife assembly 90 does not comprise a support bar for securing the clamp 54 to the knife holder 52. Instead, the clamp 54 is shown as secured to the knife holder 52 only with fasteners 60 that pass through the clamp 54 and are threaded into the knife holder 52. The heads of the fasteners 60 are received in keyway slots 74 that (similar to the slots 74 of the clamps 50 and 80 of FIGS. 12, 14, and 16) that are formed in a base portion 54B of the clamp 54 to be contiguous with a trailing edge 76 of the clamp 54 and extend toward but terminate short of a knife-engaging portion 54A of the clamp 54, forming an interior distal edge 74A within each slot 74. As such, the distal edges 74A of the slots 74 serve as stops that prevent the clamp 54 from being removed from the knife assembly 90 by being translated in the trailing direction (leftward in FIGS. 18 and 19) of the cutting head 12, but the clamp 54 can be removed from the knife assembly 90 by being translated in the leading direction (rightward in FIGS. 18 and 19) of the cutting head 12. Thereafter, the knife 56 may also be removed.

As more readily seen in the isolated view of one slot 74 in FIG. 19, similar to the slots 74 formed in the knife assemblies 50 and 80 of FIGS. 10 through 17, each slot 74 of the clamp 54 is defined to have wider and narrower portions, with the wider portions contiguous with the trailing edge 76 of the clamp 54 and the narrower portions forming the distal edges 74A of the slots 74. From FIG. 19, which depicts the result of loosening the fastener 60 and translating the clamp 54 to the right to align the head of the fastener 60 with the wider portion of the slot 74, it can be seen that the heads of the fasteners 60 are sized to pass through the wider portions of the slots 74, but cannot pass through the narrower portions of the slots 74 as a result of being larger in diameter than the widths of the narrower portions of the slots 74. As such, by sufficiently threading the fasteners 60 into the knife holder 52 while aligned with the narrower portions of the slots 74, the fasteners 60 apply a clamping force directly to the base portion 54B of the clamp 54, which is transmitted through the knife-engaging portion 54A of the clamp 54 to the knife 56 to clamp the knife 56 to the knife holder 52, from whose leading edge the knife 56 protrudes (not shown) when the knife 56 is clamped to the knife holder 52 by the clamp 54. The shaped knife 56 is overlaid and engaged by a part of the knife-engaging portion 54A that has a shape complementary to the shaped knife 56.

FIG. 19 further shows the slot 74 as having a neck 92 defined where the narrower portion of the slot 74 adjoins the wider portion of the slot 74. The neck 92 defines the narrowest width of the slot 74. FIGS. 19 and 20 further illustrate that the narrower portion of the slot 74 has a tapered wall 94 contiguous with an outer surface of the clamp 54 and extends inward into the clamp 54 to a second wall 96 formed within the slot 74 below the tapered wall 94. As seen in FIG. 20, which shows the fastener 60 within the narrower portion of the slot 74, the widths defined by the neck 92 and second wall 96 are larger than the shank 98 of the fastener 60, enabling the shank 98 to pass through all portions (the neck 92 and the wider and narrower portions) of the slots 74. However, the fastener 60 further has a shoulder 99 between the shank 99 and the fastener head that is wider/larger than the neck 92 of the slot 74, such that if the fastener 60 is sufficiently threaded into the knife holder 52 to position the shoulder 99 within the narrower portion of the slot 74, the fastener 60 cannot pass through the neck 92 and, likewise, the clamp 54 cannot be removed from the knife holder 52. As such, the neck 92 physically prevents the clamp 54 from sliding forward past the fasteners 60 as the fasteners 60 are tightened. Though shown as tapered to be complementary to the taper of the tapered wall 94 of the slot 74, the shoulder 99 could alternative be untapered, i.e., parallel to the axis of the fastener 60. However, a benefit of the shoulder 99 being tapered is that it reduces the required number of turns needed to loosen the fasteners 60 sufficiently to release the clamp 54 from the fasteners 60.

Figure 21:
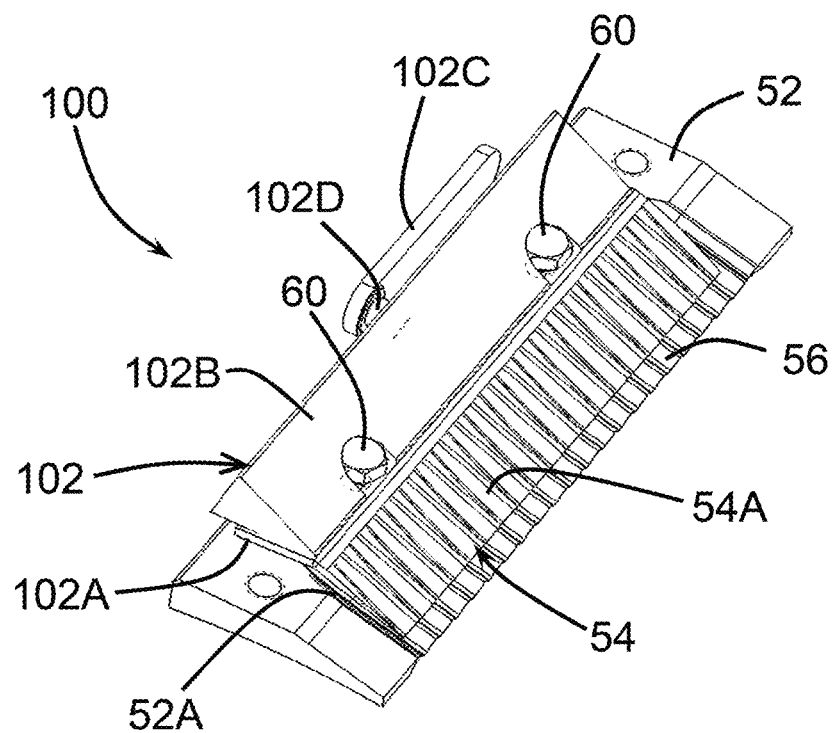
FIG. 21 is a perspective view of a knife assembly for a slicing machine, and represents the knife assembly as comprising a knife holder, a clamp retaining a shaped knife on the knife holder, and a wedge assembly securing the clamp to the knife holder according to another nonlimiting embodiment of the present invention.

FIG. 21 is a perspective view of a knife assembly 100 for a cutting head of a slicing machine (such as the cutting head 12 and machine 10 of FIG. 1) according to a fourth embodiment. According to this nonlimiting embodiment of the invention, the knife assembly 100 is represented as comprising a knife holder 52, and a clamp 54 securing a shaped knife 56 on a knife support surface 52A of the knife holder 52, from whose leading edge the knife 56 protrudes. At least a portion of the knife support surface 52A of the knife holder 52 has a shape complementary to the shaped knife 56, and the shaped knife 56 is engaged by a part of a knife-engaging portion 54A of the clamp 54 that has a shape complementary to the shaped knife 56. The knife assembly 100 further includes a wedge assembly 102 securing the clamp 54 to the knife holder 52 in cooperation with fasteners 60 that pass through the clamp 54 and are threaded into the knife holder 52. As with previous embodiments, the clamp 54 has slots (not shown) for receiving the fasteners 60, and the slots are formed in the base portion 54B of the clamp 54 to be contiguous with the trailing edge 76 of the clamp 54 and extend toward but terminate short of the knife-engaging portion 54A of the clamp 54, so that the clamp 54 can be removed from the knife assembly 100 by being translated in the leading direction (rightward in FIGS. 26, 27, and 28).

Figure 22:
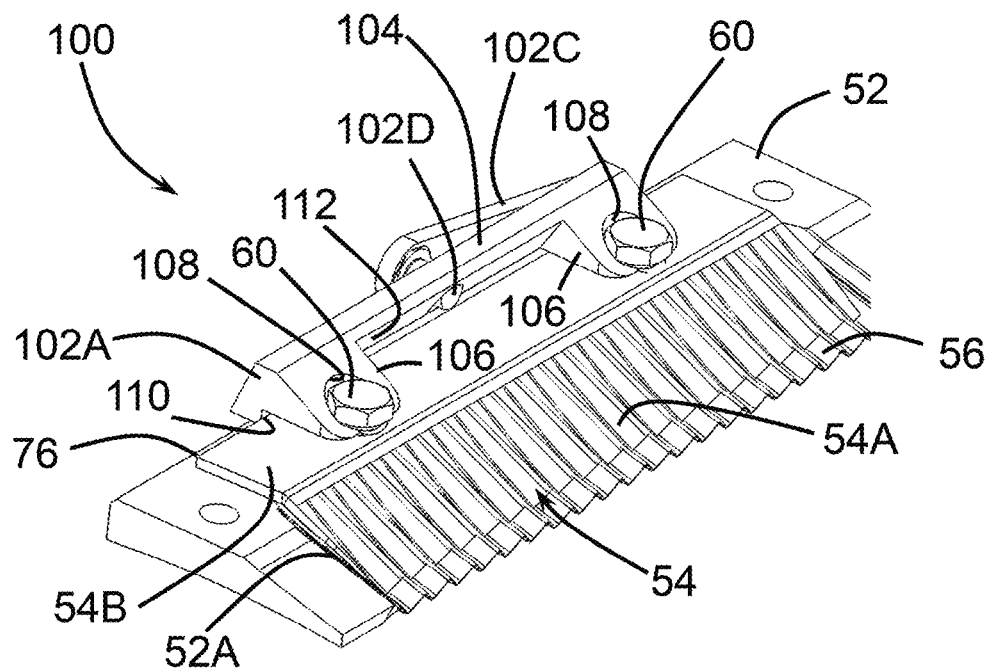
FIG. 22 is a perspective view of the knife assembly of FIG. 21 with an upper member of the wedge assembly removed.

The wedge assembly 102 is represented in FIG. 21 as comprising a lower member 102A, an upper member 102B, and a handle 102C to which a threaded shaft 102D is attached. FIG. 22 is a perspective view of the knife assembly 100 of FIG. 21 with the upper member 102B of the wedge assembly 102 removed to expose the lower member 102A. The lower member 102A can be generally described as a beam 104 from which two flanges 106 protrude on one side of the beam 104. As evident from FIG. 22, the heads of the fasteners 60 are received in recesses 108 formed in the flanges 106 of the lower member 102A, with the result that the lower member 102A is directly secured to the knife holder 52 with the fasteners 60. The lower member 102A is further represented as having a shoulder 110 formed by the beam 104 in proximity to the trailing edge 76 of the clamp 54, and a tapered sliding surface 112 also formed by the beam 104 and positioned to interact with the upper member 102B, as will be discussed below. The threaded shaft 102D of the handle 102C extends through a slot 114 (FIGS. 26 and 27) formed in the beam 104.

Figure 23:
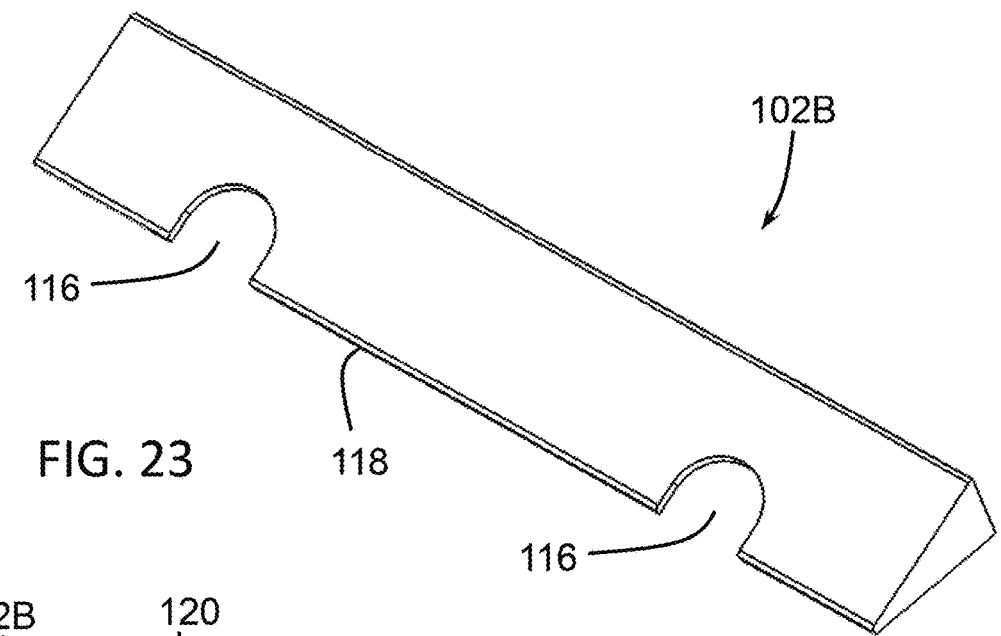
FIGS. 23, 24, and 25 are three different perspective views of the upper member of the wedge assembly of FIG. 21 showing the upper member in isolation.
Figure 24:
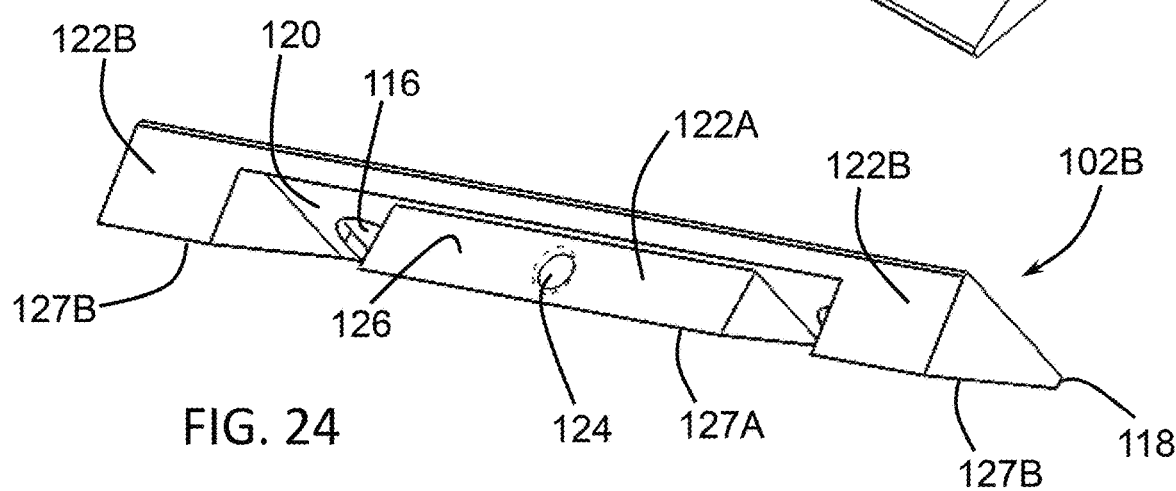
Figure 25:
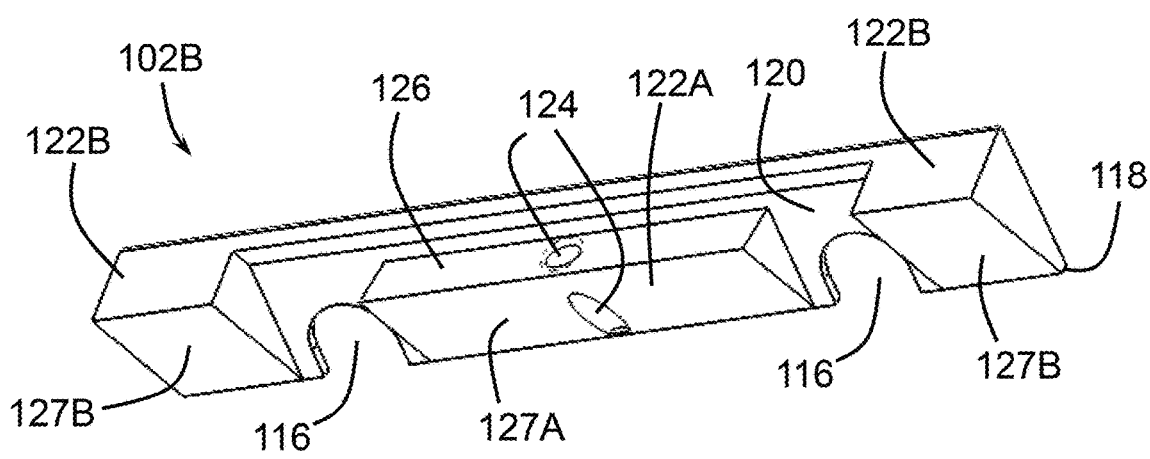

FIGS. 23, 24, and 25 are perspective isolated views of the upper member 102B of the wedge assembly 102. Slots 116 are formed in a leading edge 118 of the upper member 102B for receiving the heads of the fasteners 60, with the result that the upper member 102B is not directly secured to the knife holder 52 with the fasteners 60. Instead, the threaded shaft 102D couples the upper member 102B to the lower member 102A, which indirectly couples the upper member 102B to the knife holder 52. The upper member 102B is seen in FIGS. 23 and 24 as having a U-shaped cavity 120 on its lower side that is sized and shaped to receive the beam 104 and flanges 106 of the lower member 102A. The cavity 120 surrounds a central boss 122A in which a threaded hole 124 is formed that threadably receives the end of the threaded shaft 102D of the handle 102C that protrudes from the slot 114 in the beam 104 of the lower member 102A. The central boss 122A defines a bearing surface 126 adapted to bear against the tapered sliding surface 112 of the beam 104 of the lower member 102A. The upper member 102A also defines end bosses 122B at its longitudinal ends. The central and end bosses 122A and 122B define clamping surfaces 127A and 127B adapted to bear against the base portion 54B of the clamp 54 and thereby force the clamp 54 toward the knife holder 52.

FIGS. 26 and 27 are cross-sectional views of the knife assembly 100 of FIG. 21, representing the knife assembly 100 in unlocked (FIG. 26) and locked (FIG. 27) configurations. In FIG. 26, the fasteners 60 mount the lower member 102A to the knife holder 52, the lower member 102A is received in the cavity 120 of the upper member 102B, and the threaded shaft 102D is threaded into the threaded hole 124 formed in the central boss 122A of the upper member 102B to indirectly couple the upper member 102B to the knife holder 52. The shoulder 110 of the lower member 102A formed by the beam 104 is in proximity to the trailing edge 76 of the clamp 54, and the tapered sliding surface 112 formed by the beam 104 bears against the bearing surface 126 formed by the central boss 122A of the upper member 102B. In this unlocked configuration, the clamp 54 can be removed from the knife assembly 100 by translating the clamp 54 in the leading direction (rightward in FIGS. 26 and 27) so that the fasteners 60 exit the slots at the trailing edge 76 of the clamp 54.

FIG. 27 represents the result of using the handle 102C to thread the threaded shaft 102D into the threaded hole 124 formed in the central boss 122A of the upper member 102B, causing the upper member 102B to be pulled downward into further engagement with the lower member 102A. In particular, as the handle 102C is rotated to draw the upper member 102B toward the lower member 102A, the bearing surface 126 of the upper member 102B contacting with the tapered sliding surface 112 causes the upper member 102B to slide down the tapered sliding surface 112 because of the shorter slot depth $d_1$ in the lower member 102A at the bottom of the slot 114 as compared to the depth $d_2$ of the slot 114 in the lower member 102A at the top of the slot 114. As a result, the clamping surfaces 127A and 127B of the central and end bosses 122A and 122B of the upper member 102B force the clamp 54 toward the knife holder 52, clamping the knife 56 therebetween.

Figure 28:
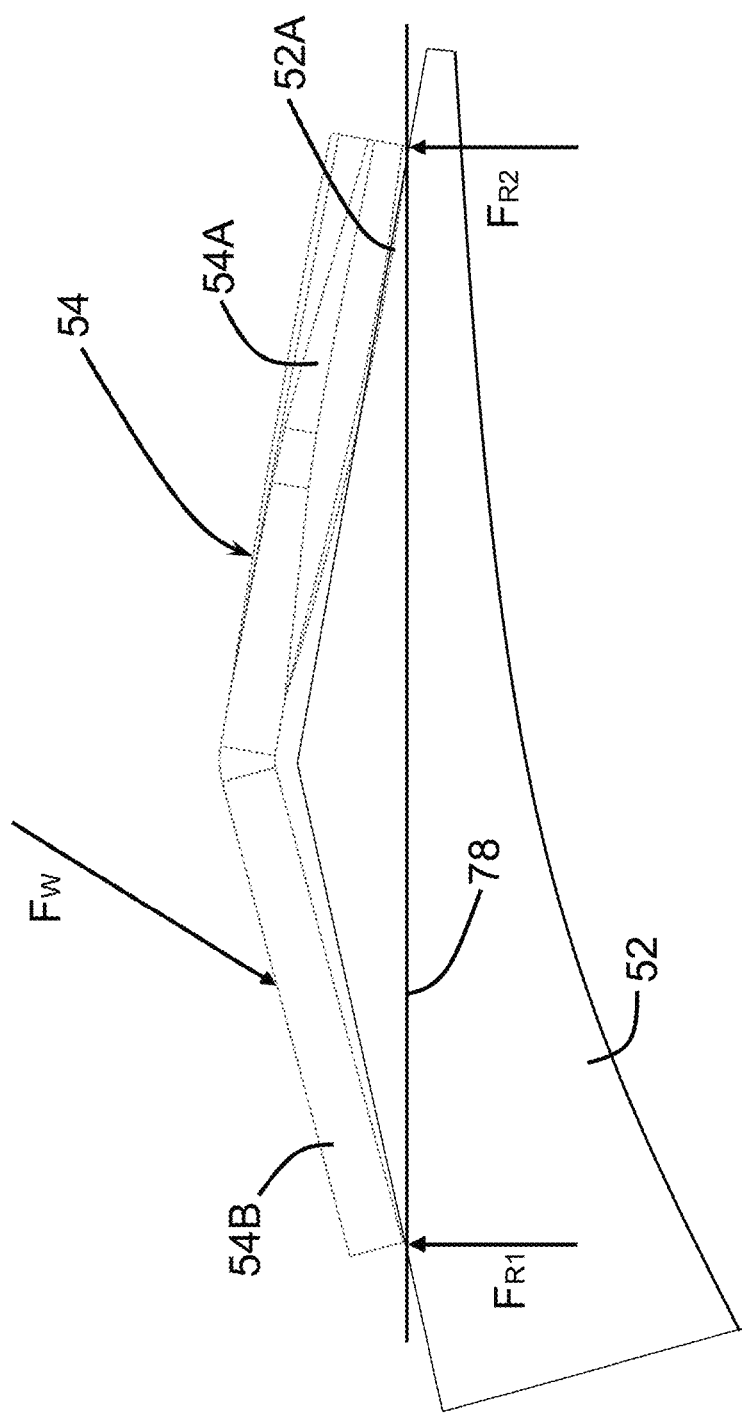
FIG. 28 schematically represents an end view of the knife assembly of FIGS. 21, 26, and 27, and diagrammatically represents forces acting on the clamp when secured to the knife holder with the wedge assembly as shown in FIGS. 21 and 27.

FIG. 28 schematically represents an end view of the knife assembly 100 of FIGS. 21, 26, and 27, and diagrammatically represents forces acting on the clamp 54 when secured to the knife holder 52 with the wedge assembly 102 as shown in FIGS. 21 and 27. Because the wedge assembly 102 applies a clamping force $F_W$ in the direction shown (parallel to the tapered sliding surface 112 of the lower member 102A), the clamp 54 is pushed in the trailing direction (leftward in FIG. 28), forcing the clamp 54 (or the narrower portions of its slots) to bear against the fasteners 60, ensuring that the position of the clamp 54 relative to the knife 56 is not altered as the fasteners 60 are tightened.

Figure 29:
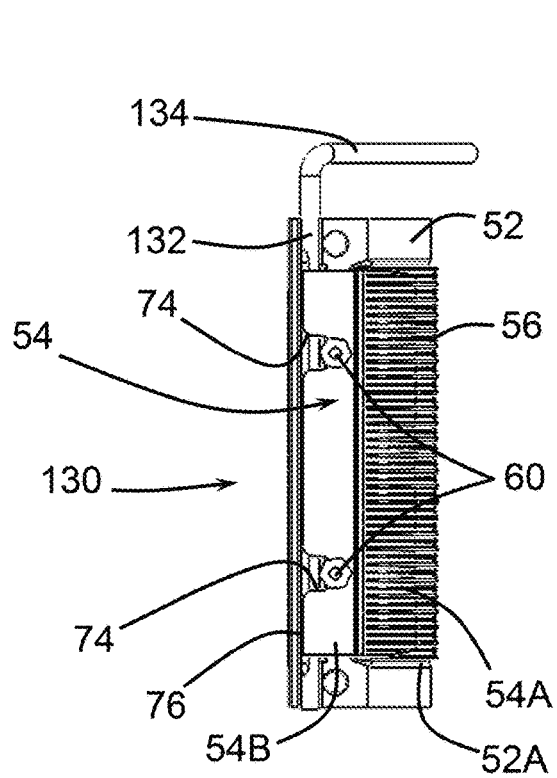
FIG. 29 is a side view of a knife assembly for a slicing machine, and represents the knife assembly as comprising a knife holder, a clamp retaining a shaped knife on the knife holder, and a cam rod generating a clamping load applied by the clamp to the knife according to another nonlimiting embodiment of the present invention.
Figure 30:
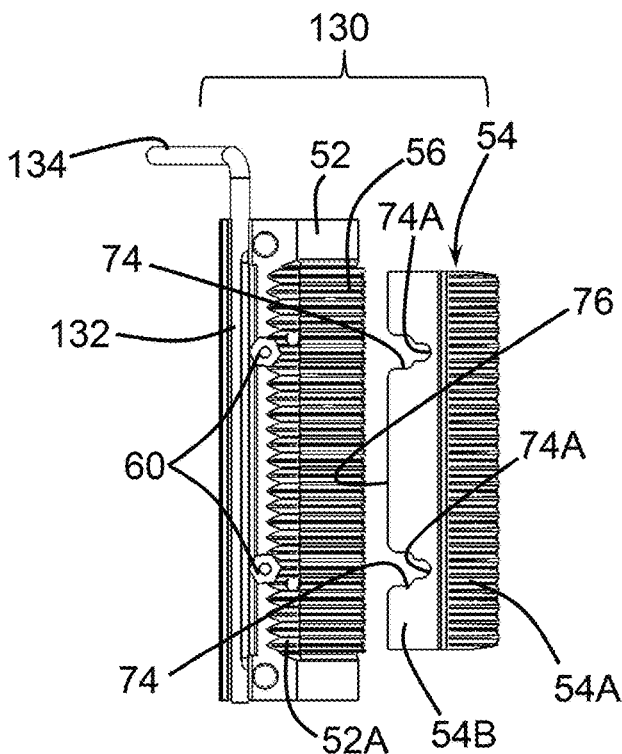
FIG. 30 shows the knife assembly of FIG. 29, and represents the cam rod as having been rotated to release the clamping load applied by the clamp to the knife.
Figure 31:
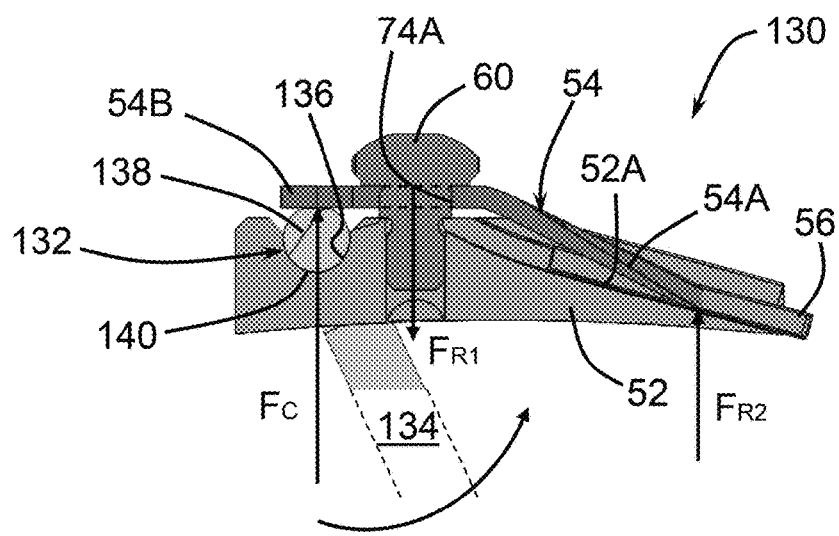
FIG. 31 schematically represents an end view of the knife assembly of FIGS. 29 and 30, and diagrammatically represents forces acting on the clamp when secured to the knife holder with the cam rod as shown in FIG. 29.

FIGS. 29, 30, and 31 depict a knife assembly 130 for a cutting head of a slicing machine (such as the cutting head 12 and machine 10 of FIG. 1) according to a fifth embodiment. According to this nonlimiting embodiment of the invention, the knife assembly 130 is represented as comprising a knife holder 52, and a clamp 54 securing a shaped knife 56 on a knife support surface 52A of the knife holder 52, from whose leading edge the knife 56 protrudes. As with previous embodiments, at least a portion of the knife support surface 52A of the knife holder 52 has a shape complementary to the shaped knife 56, and the shaped knife 56 is engaged by a part of a knife-engaging portion 54A of the clamp 54 that has a shape complementary to the shaped knife 56. The knife assembly 130 further includes a cam rod 132 between the knife holder 52 and the base portion 54B of the clamp 54 for securing the clamp 54 to the knife holder 52 in cooperation with fasteners 60 that pass through the clamp 54 and are threaded into the knife holder 52. As with previous embodiments, the clamp 54 has slots 74 for receiving the fasteners 60 so that the clamp 54 can be removed from the knife assembly 100 by being translated in the leading direction (rightward in FIGS. 29, 30, and 31). In particular, and similar to previous embodiments, wider portions of the slots 74 are contiguous with the trailing edge 76 of the clamp 54, and narrower portions of the slots 74 form distal edges 74A of the slots 74. As such, and as evident from FIGS. 29 and 31, the distal edges 74A of the slots 74 serve as stops that prevent the clamp 54 from being removed from the knife assembly 50 by being translated in the trailing direction (leftward in FIGS. 29, 30, and 31), but the clamp 54 can be removed from the knife assembly 50 by being translated in the leading direction (rightward in FIGS. 29, 30, and 31) so that the fasteners 60 exit the slots 74 at the trailing edge 76 of the clamp 54 or are aligned with the wider portions of the slots 74 to permit the fasteners 60 to pass through the slots 74 as the clamp 54 is lifted from the knife assembly 50 in the radial direction of the cutting head 12.

The clamp 54 and knife 56 are held in place on the knife holder 52 as a result of the clamp 54 being forcibly held in place on the knife holder 52 with the cam rod 132. The cam rod 132 is shown received in a channel 136 formed in the surface of the knife holder 52 and located in the trailing direction (leftward in FIGS. 29, 30, and 31) from the fasteners 60. Additionally, the longitudinal axis of the cam rod 132 is represented as oriented parallel to the longitudinal directions of the knife holder 52, clamp 54, and knife 56, and the cam rod 132 is capable of being rotated about its longitudinal axis within the channel 136. A lever 134 is attached to or formed as an extension of the cam rod 132, and rotating the cam rod 132 with the lever 134 creates a camming action that applies a force Fc to the base portion 54B of the clamp 54 outward against the heads of the fasteners 60, which serve as a fulcrum for the clamp 54 so that the camming action also generates a reaction force $F_{R1}$ where the fasteners 60 contact the clamp 54 and a reaction force $F_{R2}$ where the knife-engaging portion 54A of the clamp 54 contacts the knife 56, as shown in FIG. 31. The cam rod 132 has a recessed surface 138 defined in an otherwise circular-shaped circumferential surface 140. When the cam rod 132 is rotated so that the recessed surface 138 faces the clamp 54, the clamp 54 is released from its engagement with the cam rod 132, which in turn causes the knife-engaging portion 54A of the clamp 54 to release the knife 56. In this embodiment, FIG. 31 shows the result of having rotated the lever 134 counterclockwise (as viewed in FIG. 31) to apply the clamping load to the base portion 54B of the clamp 54 with a corner of the cam rod 132 defined by the intersection of its recessed and circumferential surfaces 138 and 140, though it is foreseeable that the cam rod 132 could be further rotated in the counterclockwise direction so that the clamping load is entirely applied to the base portion 54B with the circumferential surface 140. Rotating the lever 134 clockwise (as viewed in FIG. 31) turns the recessed surface 138 on the cam rod 132 to face the clamp 54, releasing the clamp 54 from its engagement with the cam rod 132. In this embodiment, the cam rod 132 is configured so that the corner formed by the recessed and circumferential surfaces 138 and 140 is able to engage the base portion 54B of the clamp 54 and pull the clamp 54 in the trailing direction (leftward in FIG. 31) as the clamping load is applied to pull the clamp 54 into the fasteners 60 until the fasteners 60 abut the distal edges 74A of the slots 74. Rotating the cam rod 132 in the clockwise direction pushes the clamp 54 in the leading direction (rightward in FIG. 31), pushing the edges of the slots 74 away from the fasteners 60. Consequently, the ability of this configuration to ensure that the position of the clamp 54 relative to the knife 56 is not altered as the clamping load is applied is dependent on the rotation of the cam rod 132 and on the relative locations the recessed and circumferential surfaces 138 and 140 being properly coordinated.

From the embodiments described and represented in the drawings, it should be apparent that each embodiment shown utilized fasteners 60 (or other suitable fasteners) to apply a clamping load to shaped knives 56 through knife-engaging portions 54A of clamps 54 that preferably have shapes complementary to the knives 56. According to preferred but nonlimiting aspects, the fasteners 60 are received in slots 74 that are formed in the clamps 54 and are contiguous with (open to) the trailing edges 76 of the clamps 54, which enables the clamps 54 to be removed from the knife assemblies by translating the clamps 54 in the leading direction. While desirable for enabling the removal of the clamps 54 and shaped knives 56 secured by the clamps 54, the open configurations of the slots 74 do not prevent the clamps 54 from translating relative to the knives 54 during the clamping process. To address this, each embodiment described and represented in the drawings provides means by which its clamp 54 is prevented from translating relative to the knife 56, particularly in the leading direction of the knife assembly, as the clamping load is applied to the clamp 54. In the nonlimiting embodiments, such means included the support bar 58 of FIGS. 12 through 17, the slot neck 92 and tapered wall 94 of FIGS. 12 through 20, the wedge assembly 102 of FIGS. 21 through 28, and the cam rod 132 of FIGS. 29 through 31.

While the invention has been described in terms of specific embodiments, it is apparent that other forms could be adopted by one skilled in the art. For example, the knife assemblies and cutting heads and machines in which they may be installed could differ in appearance and construction from what is shown in the drawings. Also, the knife assemblies could be used with knives that differ from what is shown in the drawings, for example, in terms of shape (flat or shaped) and, in the case of shaped knives, amplitude (distance from valley to peak) and/or pitch (distance between peaks). Furthermore, various materials and processes could be used in the manufacture of the knife assemblies and their components. Therefore, the scope of the invention is to be limited only by the claims.

The invention claimed is:

1. A knife assembly for securing a knife to a slicing machine, the knife assembly comprising:
   a knife holder having a knife support surface;
   a knife supported on the knife support surface of the knife holder so as to protrude from a leading edge of the knife holder in a leading direction of the knife assembly;
   a clamp having a base portion adjacent a trailing edge of the clamp and a knife-engaging portion adjacent a leading edge of the clamp, wherein the base portion has at least one slot formed therein and at least part of the knife-engaging portion has a shape complementary to the knife;
   a support bar overlying the clamp, the support bar being coupled within the knife assembly to have a pivot axis about which the support bar pivots relative to the knife holder, the clamp, and the knife and through which the support bar translates in the leading direction of the knife assembly and in a trailing direction of the knife assembly; and
   a fastener received in the slot in the base portion of the clamp, the fastener applying a clamping load to the support bar that is transmitted through the clamp to clamp the knife to the knife holder;
   wherein the support bar engages the clamp to prevent the clamp from translating relative to the knife in the leading direction of the knife assembly as the clamping load is applied to the clamp by the fastener.

2. The knife assembly of claim 1, wherein the slot is contiguous with and open to the trailing edge of the clamp to enable the clamp to be removed from the knife assembly by translating the clamp in the leading direction of the knife assembly.

3. The knife assembly of claim 1, wherein the slot has a wider portion adjacent the trailing edge of the clamp and a narrower portion extending toward the leading edge of the clamp.

4. The knife assembly of claim 1,
   wherein the pivot axis of the support bar is defined by a pair of pivot recesses in oppositely-disposed ends of the support bar.

5. The knife assembly of claim 4, wherein the pivot recesses are oblong to allow the support bar to translate in the leading and trailing directions of the knife assembly.

6. The knife assembly of claim 1, wherein the support bar has a recessed tapered surface that increases in thickness toward the trailing edge of the clamp, the support bar has a keyhole slot in the recessed tapered surface in which the fastener is received, and the fastener has a head that bears against the recessed tapered surface.

7. The knife assembly of claim 1, wherein the clamp is attached to the support bar to translate and pivot with the support bar relative to the knife holder and the knife.

8. The knife assembly of claim 1, wherein the slot has a wider portion adjacent the trailing edge of the clamp, a narrower portion extending toward the leading edge of the clamp, and a neck defined where the narrower portion of the slot adjoins the wider portion of the slot, the neck defining the narrowest width of the slot.

9. The knife assembly of claim 8, wherein the narrower portion of the slot has a tapered wall contiguous with an outer surface of the clamp and extends inward into the clamp to a second wall formed within the slot below the tapered wall, and the fastener has a shoulder having a shape complementary to the tapered wall.

10. The knife assembly of claim 1, wherein the preventing means comprises a wedge assembly, the wedge assembly comprising:
    a lower member secured to the knife holder with the fastener, the lower member having tapered sliding surface;
    an upper member having at least one clamping surface adapted to bear against the base portion of the clamp and thereby force the clamp toward the knife holder and clamp the shaped knife therebetween, the upper member having a bearing surface contacting the tapered sliding surface of the lower member; and
    means for causing the upper member to force the clamp toward the knife holder by causing the bearing surface of the upper member to slide down the tapered sliding surface of the lower member.

11. The knife assembly of claim 10, wherein the causing means is a threaded shaft that draws the upper member toward the lower member.

12. The knife assembly of claim 1, wherein the preventing means comprises a cam rod between the knife holder and the base portion of the clamp, and the fastener is a fulcrum between the knife-engaging portion of the clamp and a force applied by the cam rod to the base portion of the clamp.

13. The knife assembly of claim 12, wherein the cam rod is rotatable to pull the clamp in a trailing direction of the knife assembly.

14. The knife assembly of claim 1, wherein the knife is a shaped knife and the shape of the knife engaging portion of the clamp is complementary to the shaped knife.

15. The knife assembly of claim 1, wherein the knife is a flat knife and the shape of the knife engaging portion of the clamp is complementary to the flat knife.

16. A slicing machine equipped with the knife assembly of claim 1.

\* \* \* \* \*